United States Patent [19]

Garliepp et al.

[11] Patent Number: 5,459,862
[45] Date of Patent: Oct. 17, 1995

[54] NETWORK CONCURRENCY CONTROL FOR AUTONOMOUS DATABASES FEATURING INDEPENDENT LOCK RELEASE AND LOCK OWNERSHIP TRANSFER

[75] Inventors: James F. Garliepp; Paul E. Siml; Jane D. Hiscox; Terry R. Friedrichsen, all of Tucson, Ariz.

[73] Assignee: Sunquest Informaion Systems, Inc., Johnstown, Pa.

[21] Appl. No.: 129,965

[22] Filed: Sep. 30, 1993

Related U.S. Application Data

[63] Continuation of Ser. No. 537,670, Jun. 14, 1990, abandoned.
[51] Int. Cl.⁶ .................................................. G06F 17/30
[52] U.S. Cl. ..................... 395/600; 395/650; 395/490; 364/281.4; 364/282.1; 364/974.7; 364/962.1; 364/246.8; 364/DIG. 1; 364/DIG. 2
[58] Field of Search ................................ 395/650, 600, 395/425

[56] References Cited

U.S. PATENT DOCUMENTS

| | | | |
|---|---|---|---|
| 4,249,241 | 2/1981 | Aberle et al. | 395/500 |
| 4,320,451 | 3/1982 | Bachman et al. | 395/650 |
| 4,399,504 | 8/1983 | Obermarck et al. | 395/650 |
| 4,480,304 | 10/1984 | Carr et al. | 395/725 |
| 4,819,159 | 4/1989 | Shipley et al. | 395/575 |
| 4,965,719 | 10/1990 | Shoens et al. | 395/650 |

OTHER PUBLICATIONS

Ullman, Jeffrey D., *Principles of Database Systems*, Computer Science Press, (2nd ed. 1982), pp. 369–447.
Bernstein, Philip A., *Sequoia: A Fault–Tolerant Tightly–Coupled Computer for Transaction Processing*, Technical Report TR–85–03, Wang Institute of Graduate Studies, School of Information Technology, (May 2, 1985).

Primary Examiner—Thomas G. Black
Assistant Examiner—Paul R. Lintz
Attorney, Agent, or Firm—Kirkpatrick & Lockhart

[57] ABSTRACT

A system for maintaining the integrity of two substantially identical databases across a computer network consisting of two central processing units interconnected by a communications network includes means within a lock manager for maintaining a lock database on one of the central processing units, means within an application program for initiating a request for a lock to be placed on an identified entity in both of the databases to enable a data update transaction to be performed on the identified entity in both of the databases, and means within the lock manager for locking the identified entity in both of the databases by establishing an entry for the identified entity in the lock database. Such a system for maintaining database integrity also includes means within the application program for entering the data update transaction in a transaction processor queue, means within a network processor for transmitting the data update transaction to a network processor on the other central processing unit, means within a transaction processor for performing the data update transaction on the identified entity and for initiating an unlock request on the identified entity after the data update transaction has been performed, and means within the lock manager for unlocking the identified entity by modifying the entry for the identified entity in the lock database.

16 Claims, 18 Drawing Sheets

| | Entity Name | Lock Expiration Timer | Originating CPU | Current Lock Count | Original Lock Count | Job Number |
|---|---|---|---|---|---|---|
| 0000 | | | | | | |
| | | | • • • | | | 28 |
| 0030 | | | | | | |
| 0031 | | | | | | |

| Entity Name | Lock Sequence Number | Lock Sequence Number | Lock Sequence Number |
|---|---|---|---|
| | | | |
| | | • • • | 29 |
| | | | |

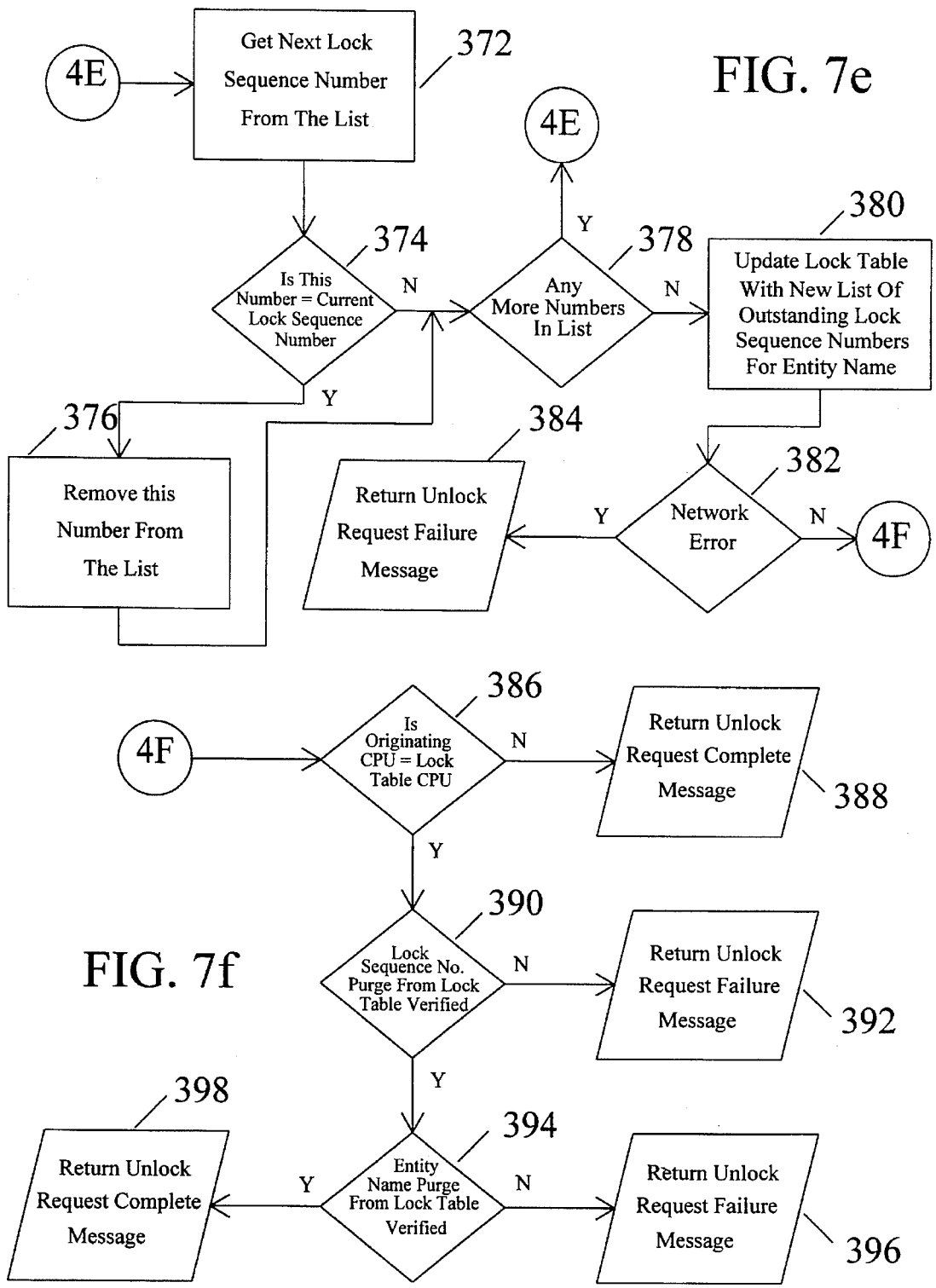

NETWORK CONCURRENCY CONTROL FOR AUTONOMOUS DATABASES FEATURING INDEPENDENT LOCK RELEASE AND LOCK OWNERSHIP TRANSFER

This is a continuation of application Ser. No. 07/537,670 filed Jun. 14, 1990, now abandoned.

BACKGROUND OF THE INVENTION

1. Field of the Invention

The present invention is directed generally to a system and method for maintaining the integrity of databases and more specifically to a system and method for maintaining the integrity of two substantially identical databases across a computer network.

2. Description of the Prior Art

Many state of the art data processing systems consist of a network of multiple central processing units ("CPUs") where all of the CPUs perform operations on a common database. One problem that is encountered with such systems is that simultaneous updates to the common database by several of the application programs that operate on these CPUs can cause incorrect results to be obtained from the application programs. The solution to this problem has been to implement a system wherein a single application program causes a "lock" to be placed on either the entire database or a predefined portion of the database. This application program can then proceed to cause updates to be made to the database. Another application program cannot perform any updates on the locked portions of the database until the first application program "unlocks" those portions of the database.

Because the common database typically resides on each CPU in the network, updates to each of these databases must be made across the network before another application program can perform updates on the locked portions of the database. As a result, this type of arrangement tends to dramatically decrease the speed of operation of the application programs. Thus, the need exists for a system wherein an application program can "unlock" the database on each CPU after the updates have been made to the database on that CPU but before the updates have been made to the databases on the other CPUs in the network.

SUMMARY OF THE INVENTION

The present invention is directed to a system for maintaining the integrity of two substantially identical databases across a computer network. The computer network consists of two central processing units interconnected by a communications network. The computer network also includes two substantially identical databases consisting of a plurality of entities defined within each of the databases wherein one of the databases resides on each of the central processing units. The computer network further consists of a transaction processor residing on each of the central processing units, application programs residing on each of the central processing units, a network processor residing on each of the central processing units and a lock manager residing on each of the central processing units.

The system for maintaining the integrity of the two substantially identical databases includes means within the lock manager on each central processing unit for maintaining a lock database on one of the central processing units, means within each application program for initiating a request for a lock to be placed on an identified entity in both of the databases to enable a data update transaction to be performed on the identified entity in both of the databases, and means within each lock manager for enabling one of the lock managers to lock the identified entity in both of the databases, in response to the means for initiating the lock request, by establishing an entry for the identified entity in the lock database. The system further includes means within each application program for entering the data update transaction in a transaction processor queue, means within each network processor for transmitting the data update transaction to the other network processor, means within each transaction processor for performing the data update transaction on the identified entity in the database on the central processing unit on which that transaction processor resides and for initiating an unlock request on the identified entity after the data update transaction has been performed, and means within each lock manager for unlocking the identified entity in the database on the central processing unit on which that lock manager resides, in response to the means for initiating the unlock request, by modifying the entry for the identified entity in the lock database.

The present invention fulfills the need which exists for a system wherein an application program performing data updates on multiple databases residing on multiple central processing units in a computer network can "unlock" the database on each central processing unit after updates have been made to that database but before updates have been made to the databases on the other central processing units in the network. These and other advantages and benefits of the present invention will become apparent from the description of a preferred embodiment hereinbelow.

BRIEF DESCRIPTION OF THE DRAWINGS

In order that the present invention may be clearly understood and readily practiced, a preferred embodiment will now be described, by way of example only, with reference to the accompanying figures wherein:

FIGS. 6 and 7a through 7f depict flow charts illustrating the steps performed by the system and method of the present invention in processing an unlock request;

DETAILED DESCRIPTION OF THE PREFERRED EMBODIMENT

Figures 1, 2A, 2B:
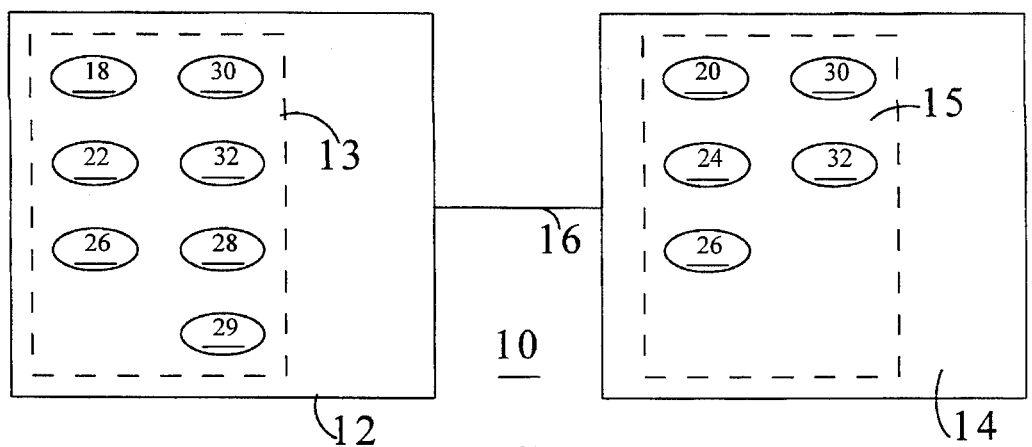
FIG. 1 illustrates a dual central processing unit computer system in which the system and method of the present invention can be employed.
FIGS. 2a and 2b illustrate lock tables for use in conjunction with the system and method of the present invention.

FIG. 1 illustrates a dual central processing unit ("CPU") computer network 10 in which the system and method of the present invention for maintaining the integrity of two substantially identical databases across a computer network can be employed. Like reference numerals are employed among the various figures to designate like elements. The dual CPU computer network 10 includes a primary CPU 12, a secondary CPU 14 and a communications link 16 interconnecting primary CPU 12 and secondary CPU 14. A first database 18 resides within the internal memory 13 of primary CPU 12 while a second database 20 resides within the internal memory 15 of secondary CPU 14. The details of the structure of first database 18 and second database 20 are not disclosed herein, however, each may be of a type generally known to those of ordinary skill in the art. One or more application programs 22 may also reside within the internal memory 13 of primary CPU 12; similarly, one or more application programs 24 may reside within the internal memory 15 of secondary CPU 14. These application programs 22 and 24 may be of any type appropriate to the primary CPU 12 and secondary CPU 14 and may or may not be identical. In addition, a lock manager program 26, a transaction processor program 30 and a network processor program 32 all reside both within the internal memory 13 of primary CPU 12 and within the internal memory 15 of secondary CPU 14.

The details of the operation of the lock manager program 26 will first be described through the use of the flow charts depicted in FIGS. 3, 4a through 4c, 5a through 5e, 6, 7a through 7f, 8 and 9a through 9c. Those aspects of the application programs 22 or 24, the transaction processor program 30 and the network processor program 32 which relate to the system and method of the present invention will then be described through the use of the flow charts illustrated in FIGS. 10 through 12.

Lock Manager Program

Lock manager program 26 resides in the internal memory 13 of primary CPU 12 and the internal memory 15 of secondary CPU 14. In addition, a lock table 28 and a lock sequence number cross-reference table 29 both reside in either the internal memory 13 of primary CPU 12 or the internal memory 15 of secondary CPU 14. The details of the structure of lock table 28 and lock sequence number cross-reference table 29 are illustrated in FIGS. 2a and 2b, respectively. Each entry of the lock table 28 contains the following data parameters each of which will be described in greater detail below: entity name, lock expiration time, originating CPU, current lock count, original lock count, and job number. The relative location of each entry in the lock table 28 corresponds to a lock sequence number associated with that entry. Each entry of the lock sequence number cross-reference table 29 contains the entity name and the corresponding lock sequence numbers. As a result, the information stored in the lock table 28 can be accessed directly using the lock sequence number; alternately, the information stored in the lock table 28 can be accessed by first obtaining the lock sequence numbers associated with an entity name in the lock sequence number cross-reference table 29 and then accessing an entry in the lock table 28 using one of these lock sequence numbers. Both the lock table 28 and the lock sequence number cross-reference table 29 are utilized by the lock manager program 26 in conjunction with one another and, as such, except where differentiation between the tables is necessary for clarity, both tables will hereinafter be referred to collectively as the lock table 28.

The lock manager program 26 is a passive utility program that can be used by any one of the application programs 22 or 24 or the transaction processor program 30 to control process activity on a given entity in either the first database 18 or the second database 20. An entity is definable by the application program 22 or 24 and may include one of the following: (1) a file (2) a portion of a file or (3) a particular element of a file. The only limitation on the definition of an entity is that once a particular application program 22 or 24 has defined an entity, all application programs 22 or 24 that perform the same or similar functions must use the same entity definition to control process activity. When a particular application program 22 or 24 wishes to perform updates on a particular entity in first database 18 or second database 20, the application program 22 or 24 calls the lock manager program 26 to place a lock on the entity so that no other process activity can be performed on this entity until the first process is completed. When the application program 22 or 24 completes the process activity on the locked entity, the entity is unlocked by the lock manager program 26. The lock manager program 26 may also refresh or renew a lock on an entity on which it has previously placed a lock.

The operation of the lock manager program 26 can best be explained by functionally dividing the program 26 into three separate processes (1) lock request (2) unlock request and (3) refresh lock request, each of which will be discussed in turn.

A. Process Lock Request

Figure 3:
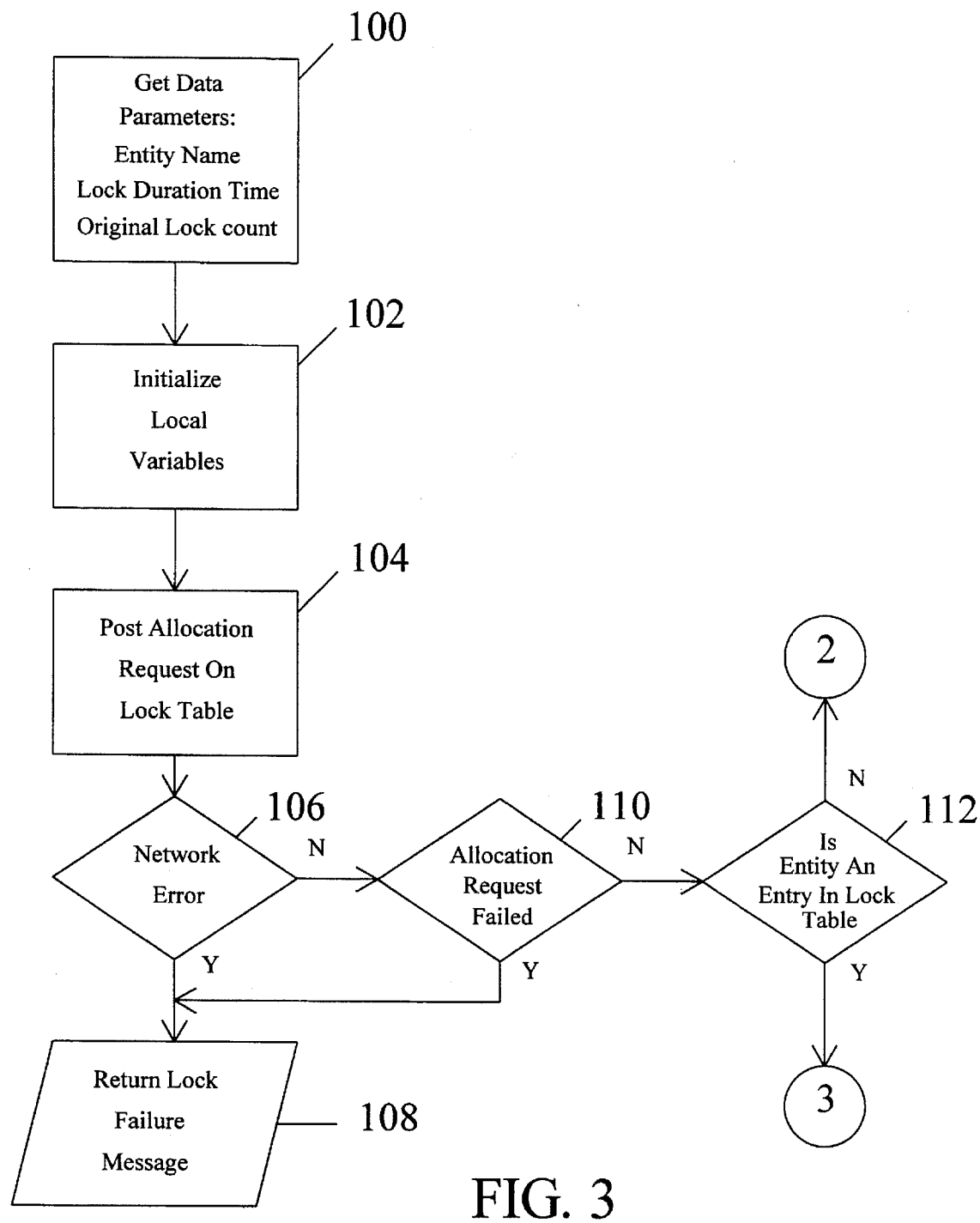
FIGS. 3, 4a through 4c and 5a through 5e depict flow charts illustrating the steps performed by the system and method of the present invention in processing a lock request.

The process lock request routine begins at step 100 illustrated in FIG. 3 where the program 26 obtains certain data parameters which are passed from the calling application program 22 or 24. These parameters include the entity name ("entity name" in lock table 28), a lock duration time and the original lock count ("original lock count" in lock table 28). The entity name identifies the particular entity in both the first database 18 and the second database 20 on which the application program 22 or 24 wishes to place a lock. The lock duration time is an integer number which indicates the length of time in seconds that the lock should remain on the entity before it is unlocked. If the lock duration time is equal to zero, the lock is infinite and will remain in existence until an unlock request on the entity is generated by either the application program 22 or 24 first requesting the lock or another application program 22 or 24. The original lock count may be equal to either a decimal one or a decimal two and identifies the type of lock that the application program 22 or 24 is requesting. If the original lock count is equal to one, the lock will be a one-phase lock. If the original lock count is equal to two, the lock will be a two-phase lock. A one-phase lock indicates that any updates to the entity must be made on both the first database 18 and the second database 20 before the entity is unlocked. A two-phase lock indicates that any updates to the entity need only be made on either the first database 18 or the second data base 20 before the entity is unlocked on that database. The two-phase lock concept extends the normal definition of locks as they are currently known so that after either the first database 18 or the second data base 20 is updated, new lock requests on the updated database 18 or 20 will be granted while lock requests on the database 18 or 20 which has not been updated will be denied. Program control then continues with step 102 where local variables are initialized (1) to indicate whether primary CPU 12 or secondary CPU 14 contains the lock table 28 and the lock sequence number cross-reference table 29 and (2) to identify the file directory on the indicated CPU 12 or 14 where the lock table 28 and lock sequence number cross-reference table 29 are stored.

Program control continues with step 104 where the program 26 generates a request to allocate the lock table 28. Program control then continues with step 106 where the program 26 determines whether a communications error has occurred on the communications network 16. This determination is made using a technique well-known to those of ordinary skill in the art. Since the lock table 28 is only resident on one CPU 12 or 14, access to the lock table 28 from the other CPU 12 or 14 must occur across the communications network 16. For every access of the lock table 28 across the communications network 16, checks must be made to insure that no failure of the communications network 16 has occurred. If at any time while accessing the lock table 28 a network error is detected, the lock request will be denied and a failure message returned to the calling application program 22 or 24. If the program 26 determines, in step 106, that a communications error has occurred, program control continues with step 108 where a message is returned to the calling application program 22 or 24 indicating that the lock request has failed. If the program 26 determines, in step 106, that a communications error has not occurred, program control continues with step 110 where the program 26 determines whether the allocation request generated in step 104 has been granted. The program 26 will wait up to ten seconds for the allocation request on the lock table 28 to be granted. If the allocation request is not granted within this period of time, program control is transferred to step 108 where a lock request failure message is returned to the application program 22 or 24. If the allocation request is granted, program control continues with step 112 where the lock sequence number cross-reference table 29 is searched to determine whether the entity name already appears as an entry.

Figure 4A:
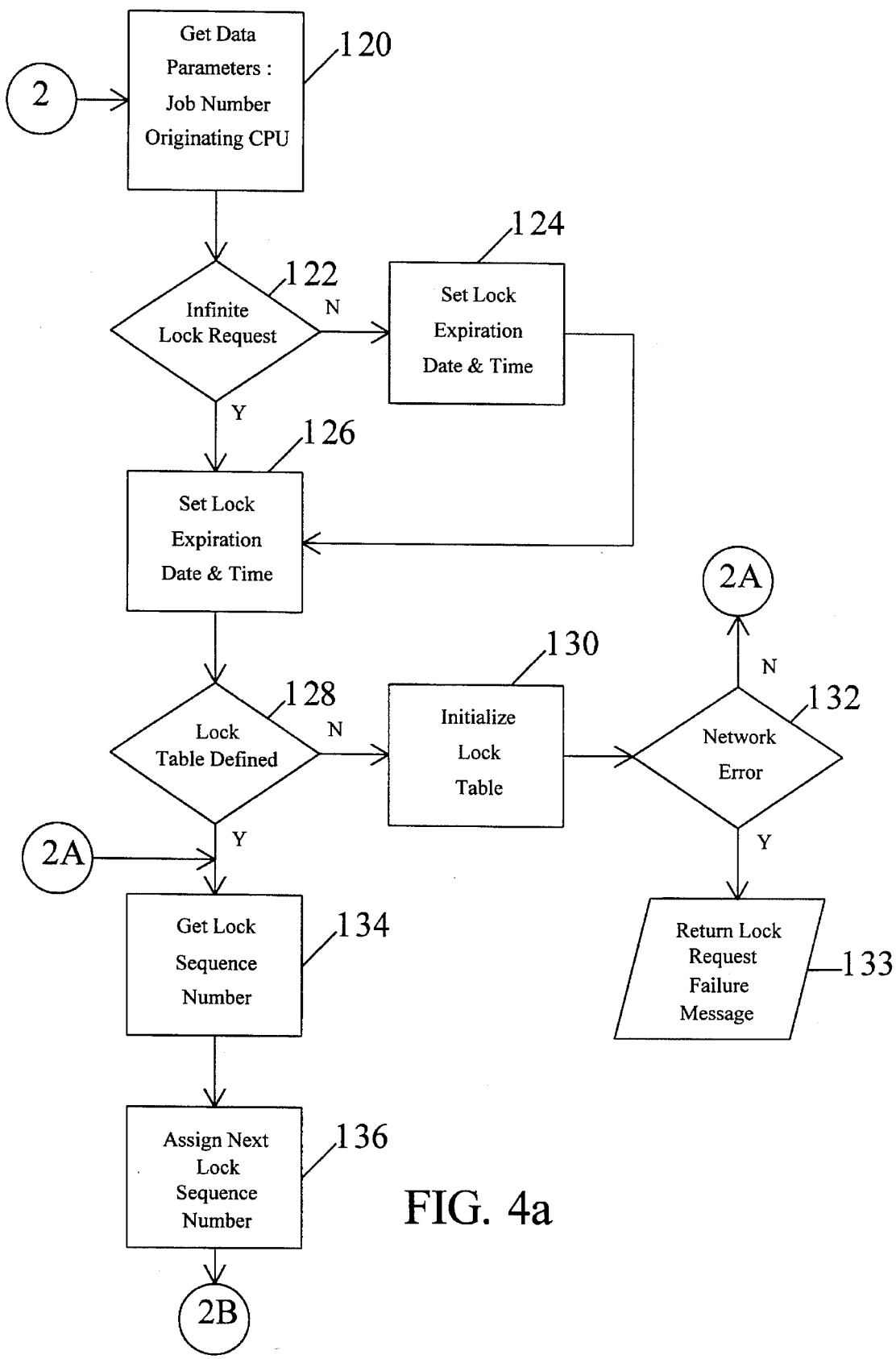

If the entity name is not located in the lock sequence number cross-reference table 29 in step 112, program control is transferred to step 120 shown in FIG. 4*a*. If the entity name is located in the lock sequence number cross-reference table 29 in step 112, program control is transferred to step 172 shown in FIG. 5*a*. In step 120, the program 26 obtains certain process data parameters from the application program 22 or 24. These data parameters include an application program job number ("job number" in lock table 28) and an identification of the CPU 12 or 14 where the calling application program 22 or 24 resides ("originating CPU" in lock table 28). The program 26 then determines, in step 122, whether the lock request is for an infinite lock or a finite lock. The program 26 makes this decision by determining whether the lock duration time which was obtained in step 100 is equal to zero signifying an infinite lock or whether it is equal to a non-zero integer signifying a finite lock. If the determination is made in step 122 that a finite lock request has been initiated, a lock expiration date and time ("lock expiration time" in lock table 28) are set in step 124. If the determination is made in step 122 that an infinite lock has been initiated, a lock expiration date and time ("lock expiration time" in lock table 28) are set to reflect this condition in step 126. Following either step 124 or step 126, program control continues with step 128 where the program 26 determines whether the lock table 28 has been defined, i.e., whether this is the first time that the program 26 has been utilized. If the lock table 28 has not previously been defined, the table 28 is initialized in step 130. Program control then continues with step 132 where the program 26 determines whether an error on the communications network 16 has occurred. If an error on the communications network 16 has occurred, the program 26 returns a lock request failure message to the application program 22 or 24 in step 133. If an error on the communications network 16 has not occurred, program control is transferred to step 134.

If the determination is made in step 128 that the lock table 28 has already been defined, program control continues with step 134 where a lock sequence number for the entity to be locked is assigned. This lock sequence number is paired with the entity name for the duration of the lock creating an entity name-lock sequence number pair which forms a unique identifier to control multiple locks on the same entity. In step 136, a next lock sequence number is generated so that it can be assigned to the next lock request that is processed. This next lock sequence number is generated by incrementing by one a next lock sequence number variable. Program control then continues with step 138 illustrated in FIG. 4*b*.

Figure 4B:
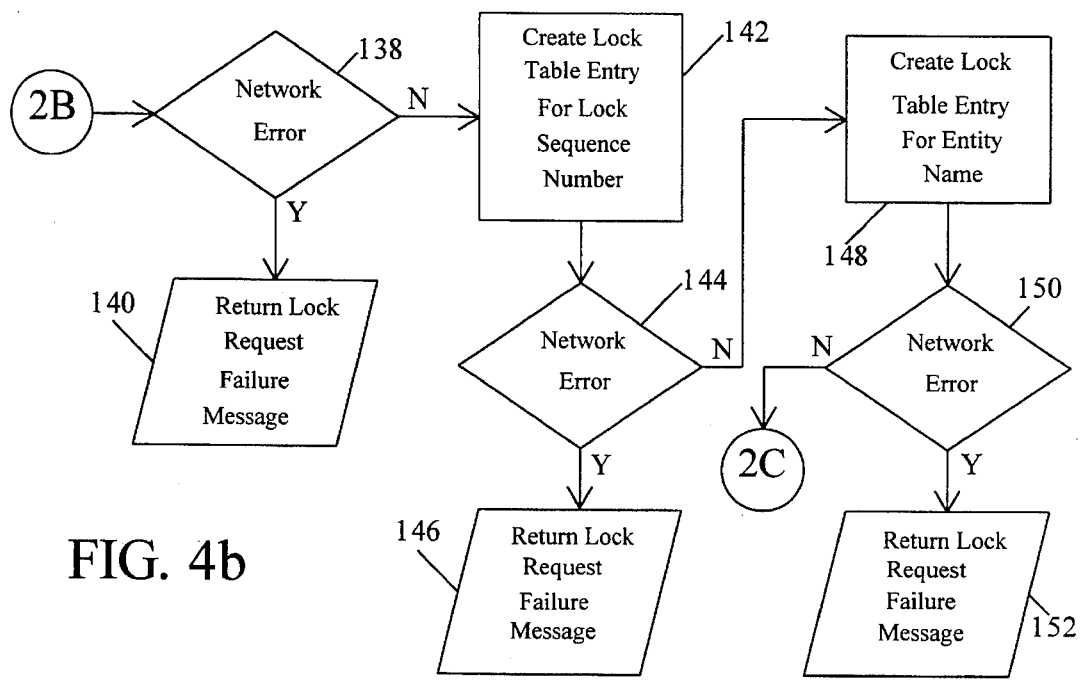
Figure 4C:
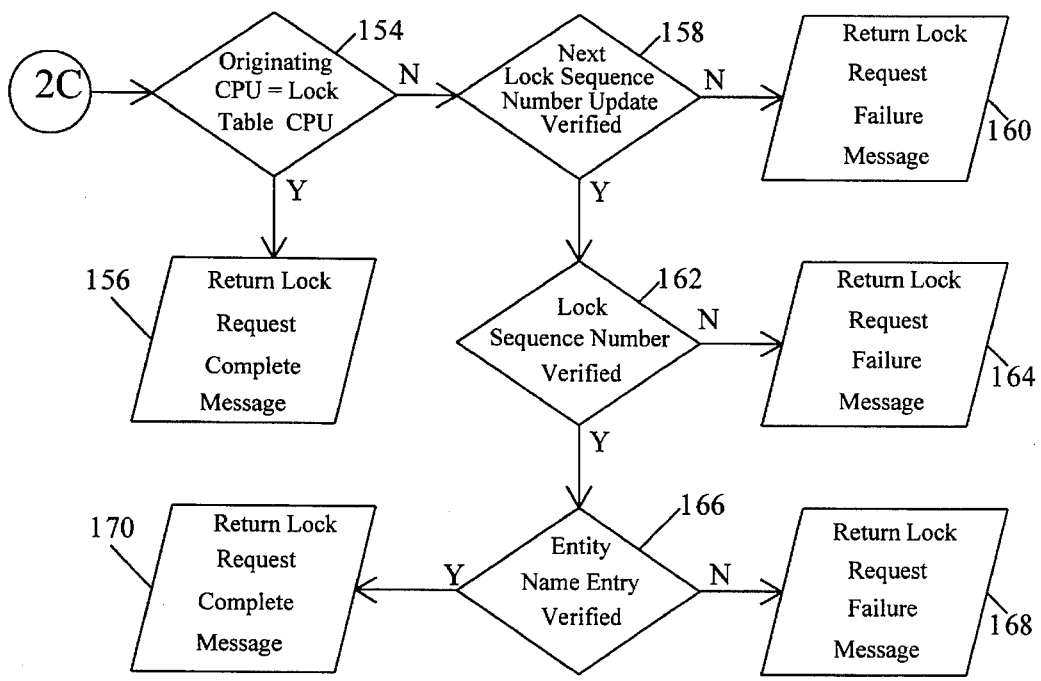

In step 138, illustrated in FIG. 4*b*, the program 26 determines whether an error on the communications network 16 has occurred. If an error has occurred, program control continues with step 140 where the program 26 returns a lock request failure message to the application program 22 or 24. If no error has occurred, program control continues with step 142 where an entry is created in the lock table 28 at a location in table 28 corresponding to the lock sequence number associated with the entity on which a lock is presently being created. Program control continues with step 144 where the program 26 determines whether any errors have occurred on the communications network 16. If any errors have occurred, program control continues with step 146 where the program 26 returns a lock request failure message to the application program 22 or 24. If no errors have occurred, program control continues with step 148 where an entry is created in the lock sequence number cross-reference table 29 for the entity name on which a lock is presently being created. Program control continues with step 150 where the program 26 determines whether an error has occurred on the communications network 16. If an error has occurred, program control continues with step 152 where the program 26 returns a lock request failure message to the application program 22 or 24. If no errors have occurred, program control continues with step 154 illustrated in FIG. 4*c*.

In step 154, the program 26 determines whether the application program 22 or 24 initiating the lock request resides on the same CPU 12 or 14 where the lock table 28 is stored. If the lock request was initiated on the same CPU 12 or 14 where the lock table 28 is stored, program control continues with step 156 where a lock request complete message is returned to the calling application program 22 or 24. If the determination is made in step 154 that the lock request was not initiated on the same CPU 12 or 14 on which the lock table 28 is stored, i.e., the lock request has occurred via the communications network 16, program control continues with step 158 where the program 26 verifies that the next lock sequence number variable has been incremented. If the next lock sequence number variable has not been incremented, program control continues with step 160 where a lock request failure message is returned to the calling application program 22 or 24. If the next lock sequence number variable has been incremented, program control continues with step 162 where the program 26 determines whether an entry has been created in the lock table 28 at a location corresponding to the lock sequence number associated with the lock request currently being processed. If such an entry has not been created in the lock table 28, a lock request failure message is returned to the application program 22 or 24 in step 164. If such an entry has been created, program control continues with step 166 where the program 26 determines whether the entity name on which a lock is currently being processed appears in the lock sequence number cross-reference table 29. If the entity name does not appear in the lock sequence number cross-reference table 29, a lock request failure message is returned to the application program 22 or 24 in step 168. If the entity name does appear in the lock sequence number cross-reference table 29, program control continues with step 170 where a lock request complete message is returned to the application program 22 or 24.

Figure 5A:
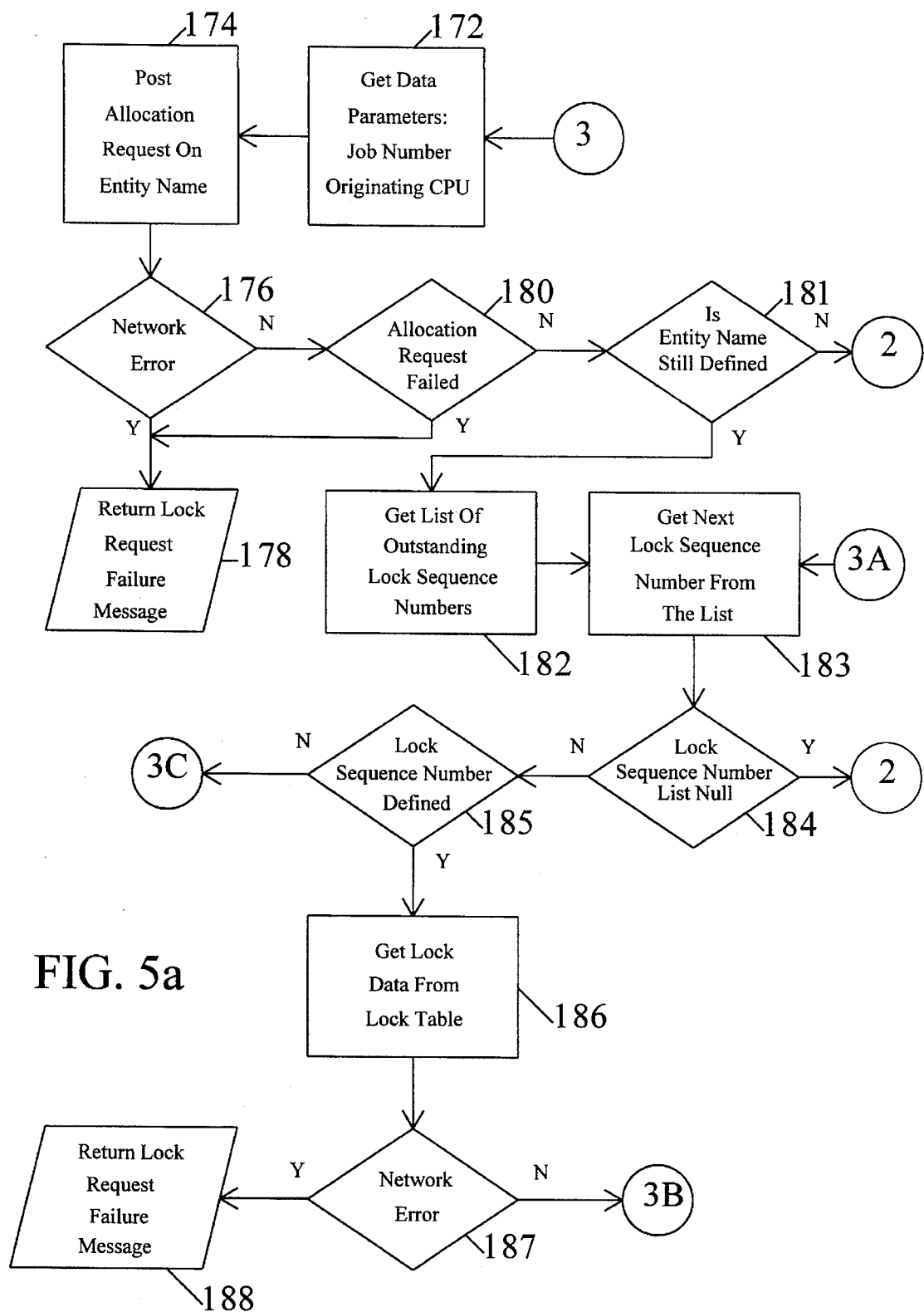
Figure 5B:
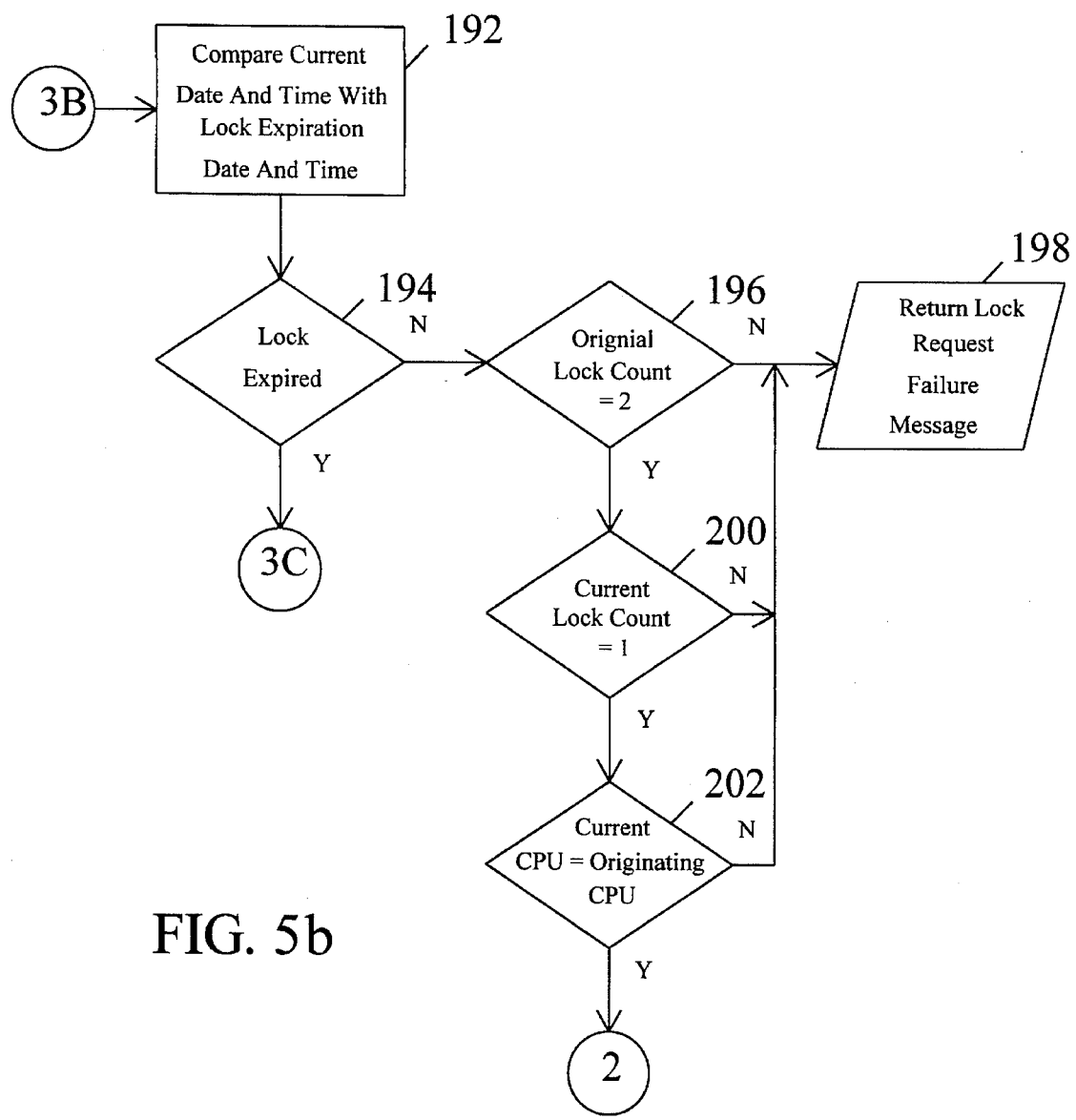

If the entity name was located in the lock sequence number cross-reference table 29 in step 112 in FIG. 3, program control continues with step 172 shown in FIG. 5a where the program 26 obtains certain process data parameters from the application program 22 or 24. These data parameters include the application program job number ("job number" in lock table 28) and the identification of the CPU 12 or 14 where the calling application program 22 or 24 resides ("originating CPU" in lock table 28). Program control then continues with step 174 where an allocation request on the entity name on which a lock is to be created is generated by the program 26. Program control continues with step 176 where the program 26 determines whether an error has occurred on the communications network 16. If an error has occurred, program control continues with step 178 where a lock request failure message is returned to the application program 22 or 24. If a network error did not occur, program control continues with step 180 where the program 26 determines whether the allocation request on the entity name generated in step 174 has been granted. The program 26 will wait up to ten seconds for the request to be granted. If the allocation request has not been granted within this time period because the entity is currently in use by another process, program control continues with step 178 where a lock request failure message is returned to the application program 22 or 24. If the allocation request is granted, program control continues with step 181 where the program 26 determines whether the entity name appears in the lock sequence number cross-reference table 29. If the entity name does not appear in the lock sequence number cross-reference table 29, program control is returned to step 120 illustrated in FIG. 4a. If the entity name appears in the lock sequence number cross-reference table 29, program control continues with step 182 where the program 26 obtains a list, from the lock sequence number cross-reference table 29, of all lock sequence numbers associated with the entity name for which a lock request is currently being processed. Program control then continues with step 183 where program 26 obtains the next lock sequence number from the list generated in step 182. Program control continues with step 184 where the program 26 determines whether there are either no lock sequence numbers in the list generated in step 182 or the list of lock sequence numbers generated in step 182 has been exhausted. If either of these conditions are met, program control is transferred to step 120 illustrated in FIG. 4a; otherwise, program control continues with step 185 where the program 26 determines whether an entry exists in the lock table 28 at a location corresponding to the lock sequence number obtained from the list generated in step 182, i.e., does a lock corresponding to this lock sequence number still exist. If such an entry does not exist, program control continues with step 206 shown in FIG. 5c. If such an entry does exist, program control continues with step 186 where the lock data for this lock sequence number is retrieved from the lock table 28. The program 26 then determines whether a communications network error has occurred on the communications network 16 in step 187. If an error has occurred, program control continues with step 188 where a lock request failure message is returned to the application program 22 or 24. If an error has not occurred, program control continues with step 192 shown in FIG. 5b.

In step 192, the current date and time are compared to the lock expiration date and time obtained from the lock table 28 in step 186. In step 194, the program 26 determines whether the lock has expired. If the lock has expired, i.e., the lock expiration date and time are prior to the current date and time, program control continues with step 206 shown in FIG. 5c. If the lock has not expired, program control continues with step 196 where the program 26 determines whether the original lock count obtained from the lock table 28 in step 186 is equal to two. If the original lock count is not equal to two, program control continues with step 198 where a lock request failure message is returned to application program 22 or 24. If the original lock count is equal to two, program control continues with step 200 where the program 26 determines whether the current lock count obtained from the lock table 28 in step 186 is equal to one. If the current lock count is not equal to one, i.e., the current lock count is equal to two, program control continues with step 198 where a lock request failure message is returned to the application program 22 or 24. If the current lock count is equal to one, program control continues with step 202 where the program 26 determines whether the CPU requesting the lock is the CPU where the previous lock originated. This determination is made by comparing the originating CPU data obtained in step 172 with the originating CPU data obtained from the lock table 28 in step 186. If these CPUs are not the same, program control continues with step 198 where a lock request failure message is returned to the application program 22 or 24. If these CPUs are the same, program control is returned to step 120 shown in FIG. 4a so that a new lock request may be processed.

Figure 5C:
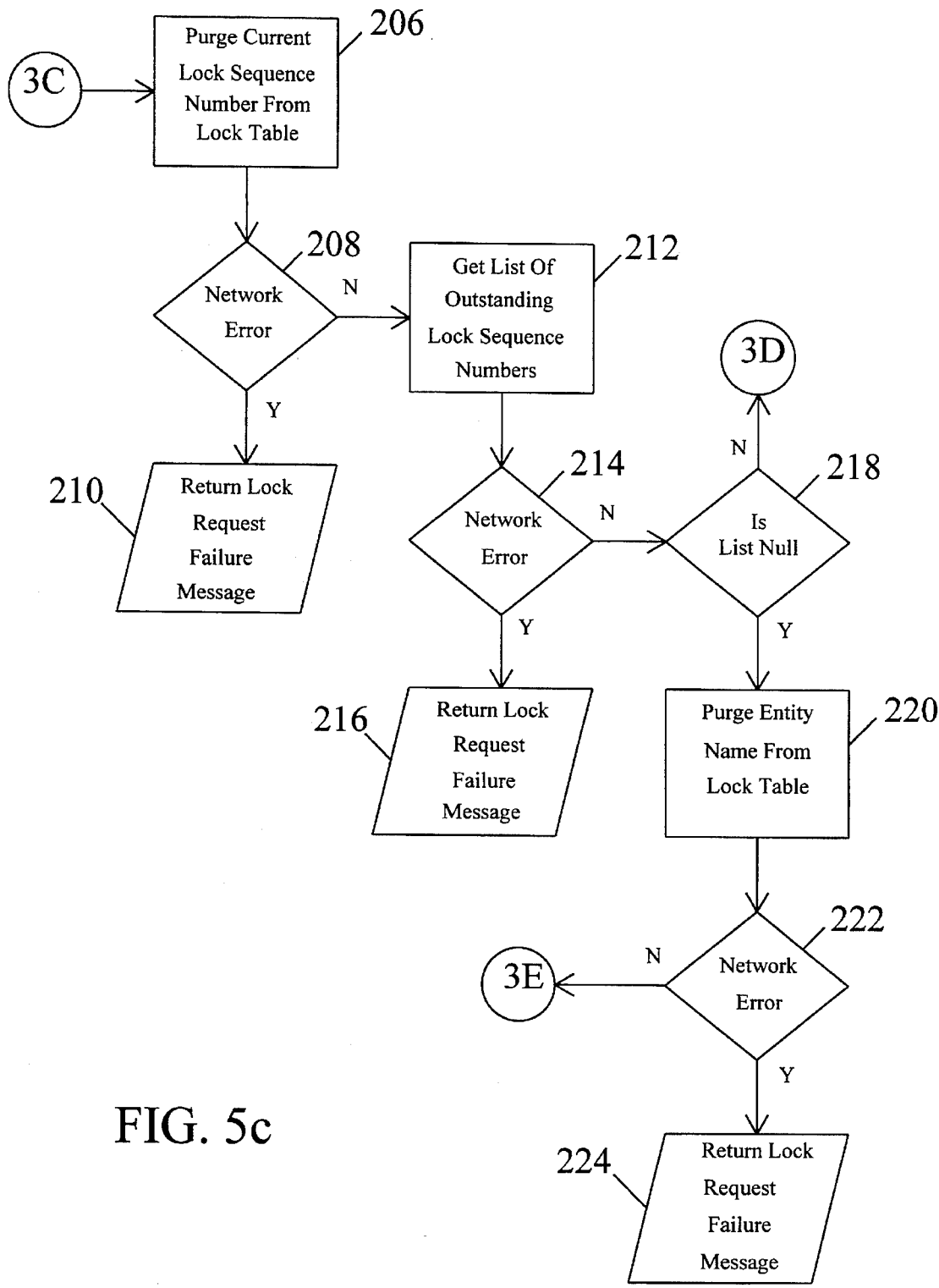

In step 206, illustrated in FIG. 5c, the program 26 removes the entry in the lock table 28 at a location corresponding to the lock sequence number obtained from the list generated in step 182. Program control then continues with step 208 where the program 26 determines whether an error has occurred on the communications network 16. If an error has occurred, program control continues with step 210 where a lock request failure message is returned to the application program 22 or 24. If an error has not occurred, program control continues with step 212 where the program 26 obtains a list, from the lock sequence number cross-reference table 29, of all lock sequence numbers associated with the entity name for which a lock request is currently being processed. Program control continues with step 214 where the program 26 determines whether an error has occurred on the communications network 16. If an error has occurred, program control continues with step 216 where a lock request failure message is returned to the application program 22 or 24. If an error has not occurred, program control continues with step 218 where the program 26 determines whether there are no lock sequence numbers in the list generated in step 212. If there are lock sequence numbers in the list, program control continues with step 226 shown in FIG. 5d. If there are no lock sequence numbers in the list, program control continues with step 220 where the entity name on which a lock request is currently being processed is removed from the lock sequence number cross-reference table 29. Program control continues with step 222 where the program 26 determines whether an error has occurred on the communications network 16. If an error has occurred, program control continues with step 224 where a lock request failure message is returned to the application program 22 or 24. If an error has not occurred, program control continues with step 240 shown in FIG. 5e.

Figure 5D:
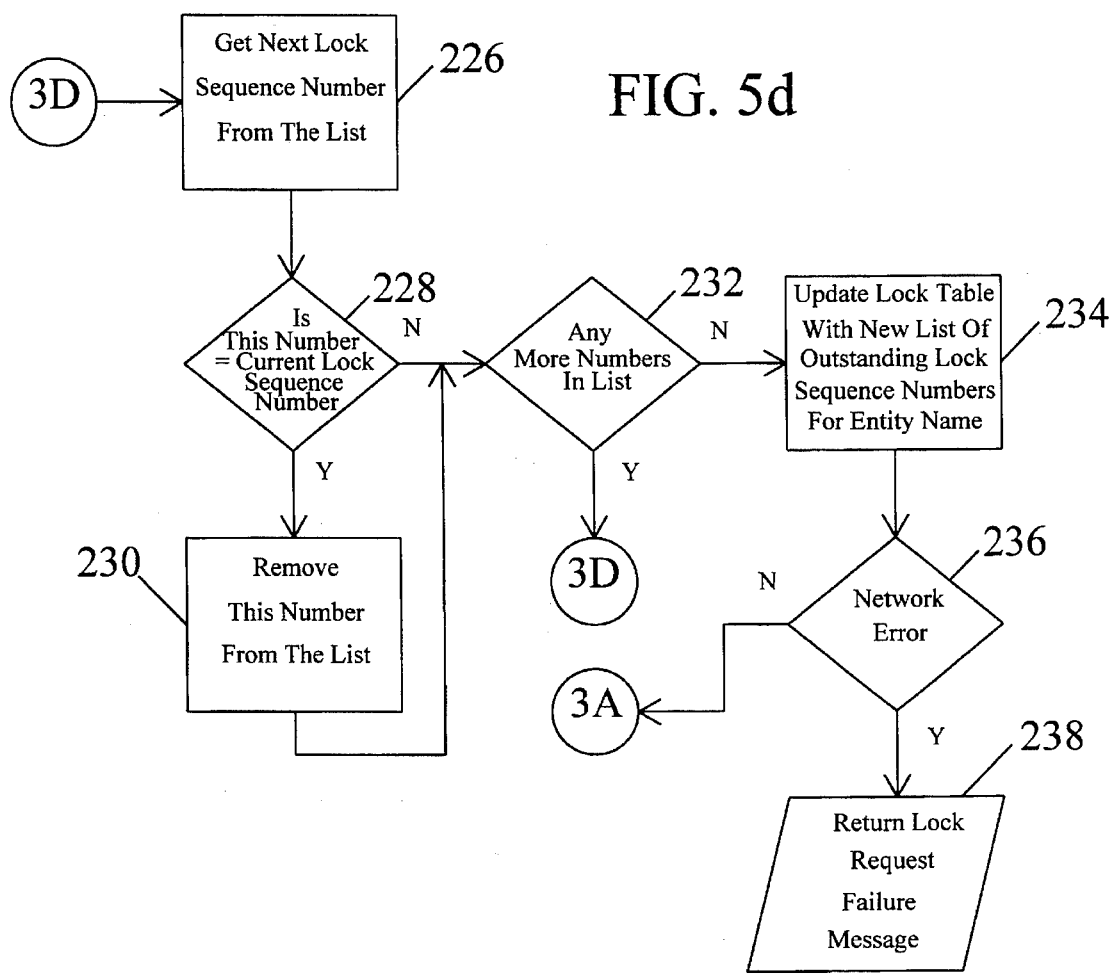

In step 226, shown in FIG. 5d, the program 26 obtains the next lock sequence number from the list generated in step 212 shown in FIG. 5c. Program control continues with step 228 where the program 26 determines whether the lock sequence number obtained in step 226 is equal to the lock sequence number obtained from the list generated in step 182 shown in FIG. 5a. If these lock sequence numbers are equal, program control continues with step 230 where the lock sequence number obtained in step 226 is removed from the list of lock sequence numbers generated in step 212. If the lock sequence numbers are not equal, or following step 230, program control continues with step 232 where the program 26 determines whether any lock sequence numbers remain in the list generated in step 212. If any lock sequence numbers remain in the list, program control is returned to step 226. If no lock sequence numbers remain in the list generated in step 212, program control continues with step 234 where the lock sequence number cross-reference table 29 is updated with the newly obtained list of lock sequence numbers associated with the entity name on which a lock request is currently being processed. Program control continues with step 236 where the program 26 determines whether an error has occurred on the communications network 16. If an error has occurred, program control continues with step 238 where a lock request failure message is returned to the application program 22 or 24. If an error has not occurred, program control is returned to step 183 shown in FIG. 5a.

Figure 5E:
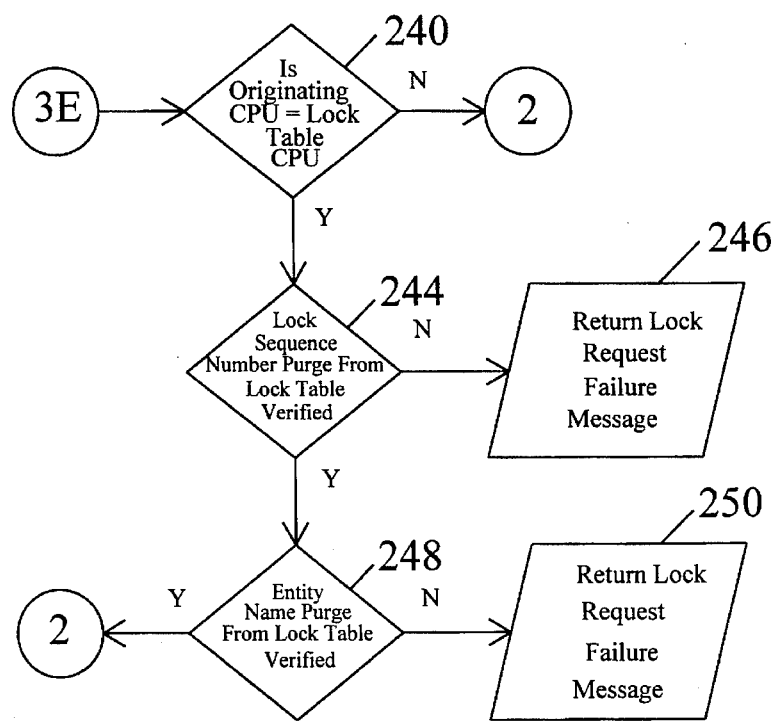

In step 240, shown in FIG. 5e, the program 26 determines whether the CPU 12 or 14 on which the current lock request originated is the same as the CPU 12 or 14 on which the lock table 28 is stored. If the CPUs are the same, program control is returned to step 120 shown in FIG. 4a where the current lock request is processed. If the CPUs are not the same, program control continues with step 244 where the program 26 verifies that the entries in the lock table 28 corresponding to the inactive lock sequence numbers were purged from the lock table 28. If the purge is not verified, program control continues with step 246 where a lock request failure message is returned to the application program 22 or 24. If the purge is verified, program control continues with step 248 where the program 26 verifies that the entry in the lock sequence number cross-reference table 29 corresponding to the entity name with which no lock sequence numbers were associated was purged from the lock sequence number cross-reference table 29. If the purge is not verified, program control continues with step 250 where a lock request failure message is returned to the application program 22 or 24. If the purge is verified, program control is returned to step 120 shown in FIG. 4a.

B. Process Unlock Request

Figure 6:
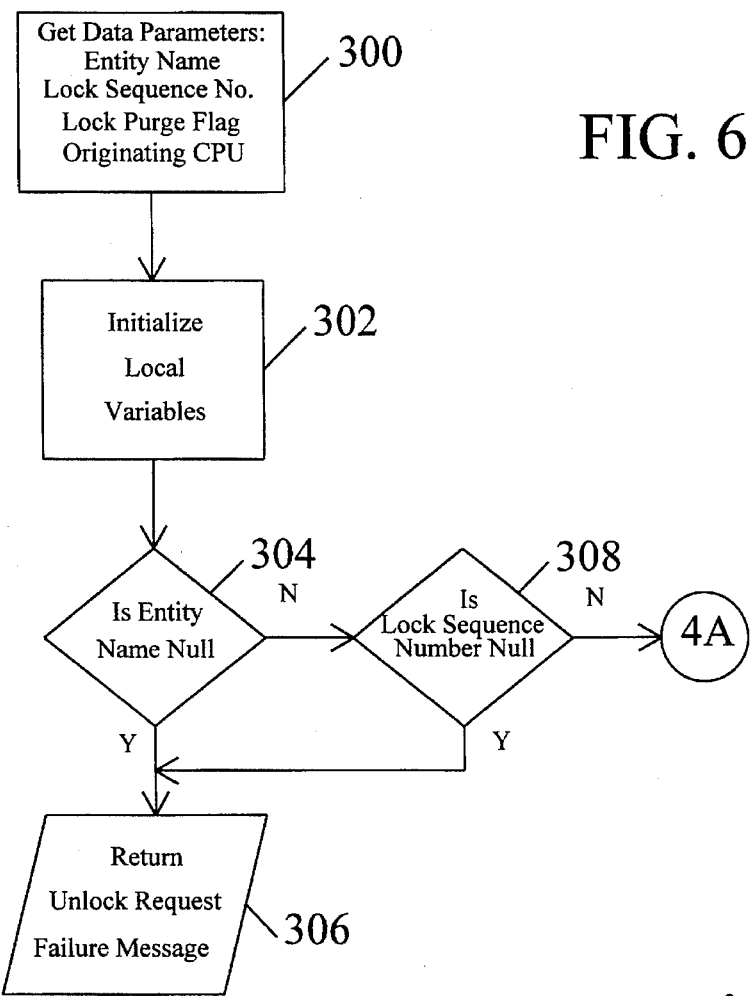

The process unlock request routine begins at step 300 illustrated in FIG. 6 where the program 26 obtains certain data parameters which are passed from the calling application program 22 or 24. These parameters include the entity name ("entity name" in lock table 28), the lock sequence number ("lock sequence number" in lock sequence number cross-reference table 29), a lock purge flag, and an identification of the CPU 12 or 14 where the calling application program 22 or 24 resides ("originating CPU" in lock table 28). If the lock purge flag is set (equal to one), this indicates that a lock should be removed from the lock table 28 even though the current lock count is not equal to zero. Program control then continues with step 302 where local variables are initialized (1) to indicate whether primary CPU 12 or secondary CPU 14 contains the lock table 28 and the lock sequence number cross-reference table 29 and (2) to identify the file directory on the indicated CPU 12 or 14 where the lock table 28 and lock sequence number cross-reference table 29 are stored. Program control continues with step 304 where the program 26 determines whether the entity name has been passed from the application program 22 or 24. If the entity name has not been passed, program control continues with step 306 where an unlock request failure message is returned to the application program 22 or 24. If the entity name has been passed, program control continues with step 308 where the program 26 determines whether the lock sequence number has been passed from the application program 22 or 24. If the lock sequence number has been passed, program control continues with step 310 shown in FIG. 7a. If the lock sequence number has not been passed, program control continues with step 306 where an unlock request failure message is returned to the application program 22 or 24.

Figure 7A:
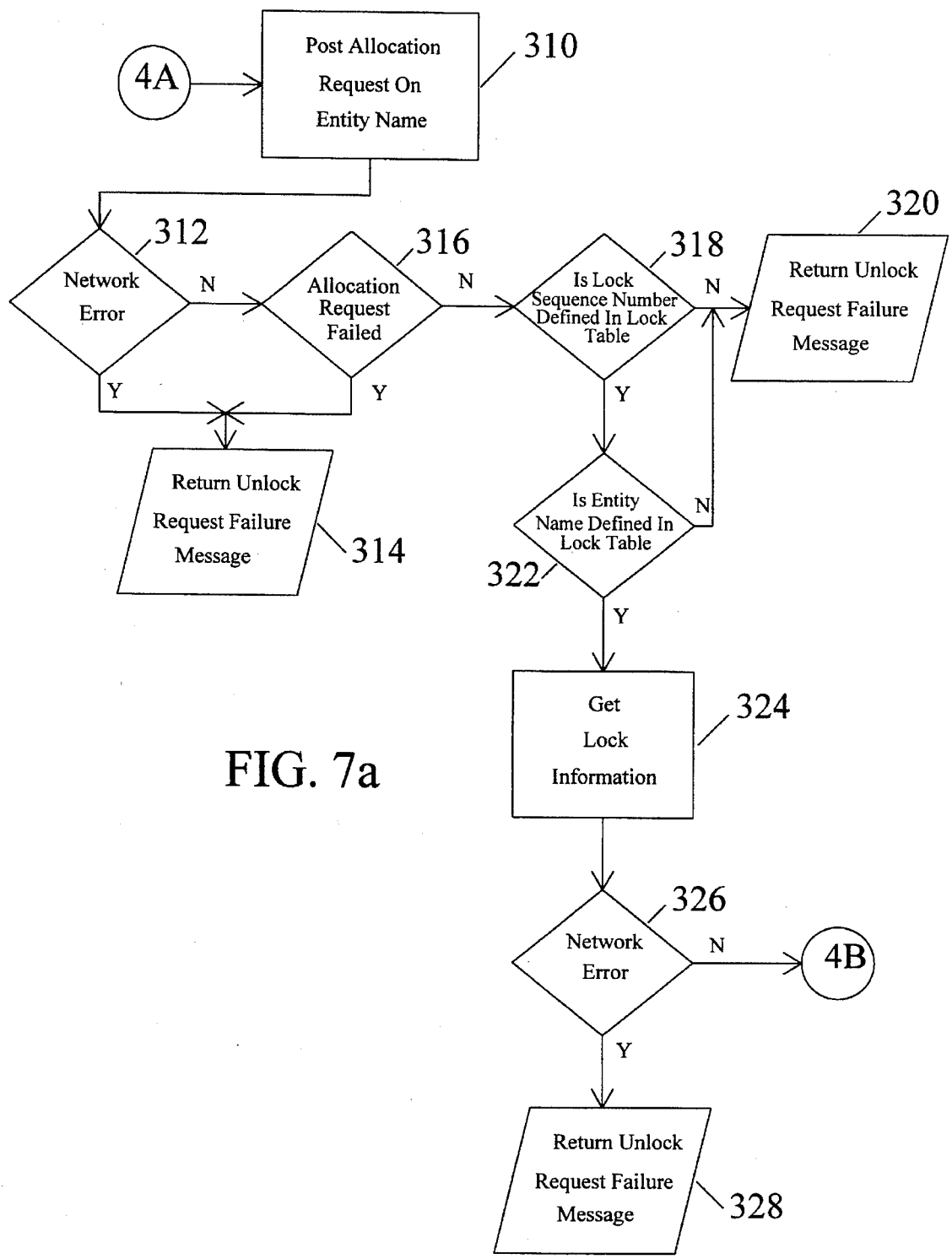

In step 310, shown in FIG. 7a, the program 26 generates an allocation request on the entity name which is to be unlocked. Program control continues with step 312 where the program 26 determines whether an error has occurred on the communications network 16. If an error has occurred, program control continues with step 314 where an unlock request failure message is returned to the application program 22 or 24. If a network error did not occur, program control continues with step 316 where the program 26 determines whether the allocation request on the entity name generated in step 310 has been granted. The program 26 will wait up to ten seconds for the request to be granted. If the allocation request has not been granted within this time period because the entity is currently in use by another process, program control continues with step 314 where an unlock request failure message is returned to the application program 22 or 24. If the allocation request is granted, program control continues with step 318 where the program 26 determines whether an entry exists at a location in the lock table 28 corresponding to the lock sequence number currently being processed. If such an entry does not exist, program control continues with step 320 where an unlock request failure message is returned to the application program 22 or 24. If such an entry does exist, program control continues with step 322 where the program 26 determines whether the entity name currently being processed appears in the lock sequence number cross-reference table 29. If the entry name does not appear, program control continues with step 320 where an unlock request failure message is returned to the application program 22 or 24. If the entry name does appear, program control continues with step 324 where the lock data at the location in the lock table 28 corresponding to the lock sequence number currently being processed is obtained. Program control continues with step 326 where the program 26 determines whether an error has occurred on the communications network 16. If an error has occurred, program control continues with step 328 where an unlock request failure message is returned to the application program 22 or 24. If an error has not occurred, program control continues with step 330 shown in FIG. 7b.

Figure 7B:
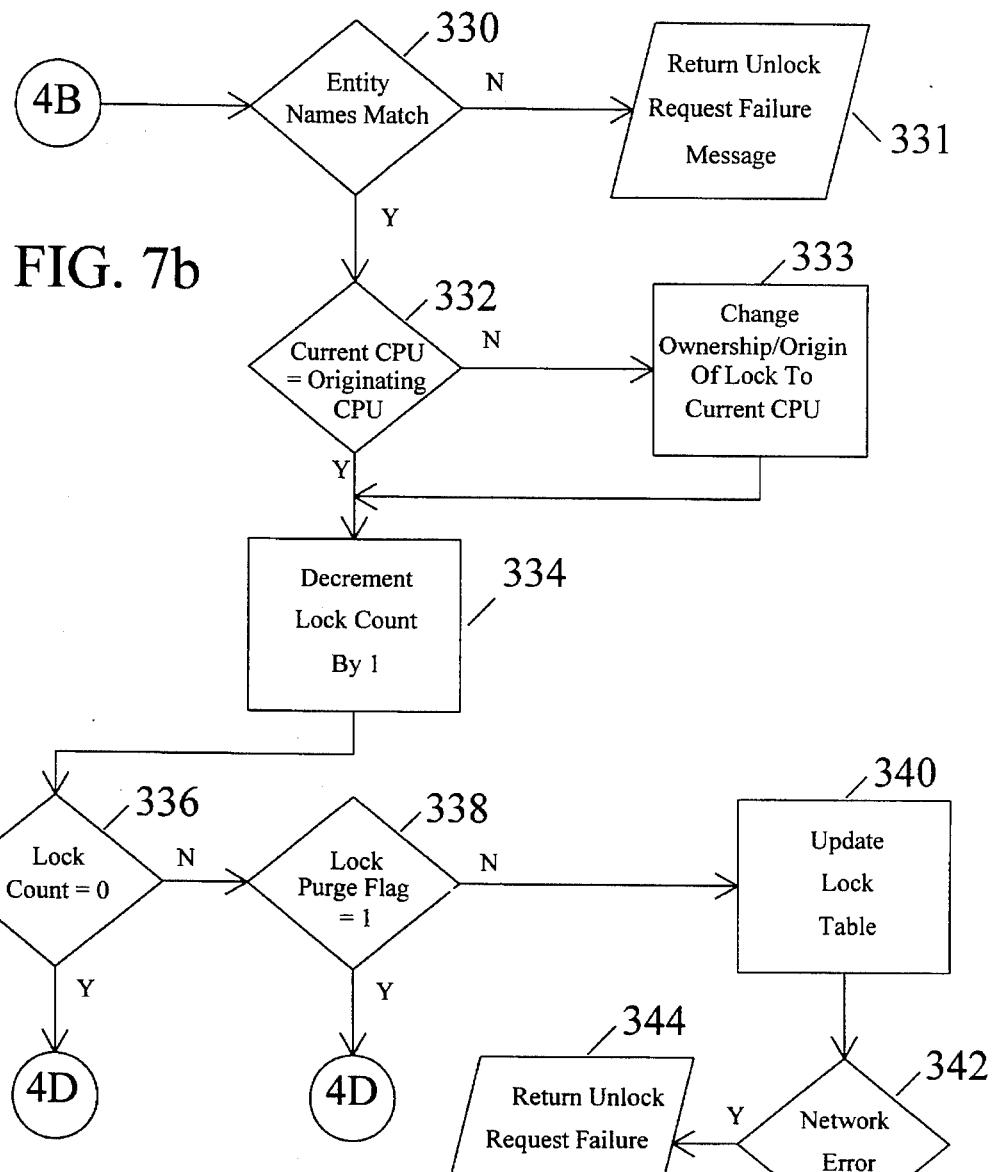

The program 26, in step 330 shown in FIG. 7b, determines whether the entity name stored at the location in the lock table 28 corresponding to the lock sequence number passed from the application program 22 or 24 matches the entity name passed from the application program 22 or 24. If the entity names do not match, program control continues with step 331 where an unlock request failure message is returned to the application program 22 or 24. If the entity names match, program control continues with step 332 where the program 26 determines whether the CPU on which the unlock request originated is the CPU which had previously requested the lock. This determination is made by comparing the originating CPU data obtained in step 300 with the originating CPU data obtained from the lock table 28 in step 324. If the CPUs are not the same, program control continues with step 333 where the CPU ownership of the lock is changed by modifying the originating CPU field for the entry in the lock table 28 associated with the lock sequence number for which an unlock request is currently being processed. If the CPUs are determined to be the same in step 332 or following step 333, program control continues with step 334 where the current lock count obtained from the lock table 28 in step 324 is decremented by one. Program control continues with step 336 where the program 26 determines whether the current lock count is equal to zero. If the current lock count is equal to zero, program control is transferred to step 352 shown in FIG. 7d. If the current lock count does not equal zero, program control continues with step 338 where the program 26 determines whether the lock purge flag is equal to one. If the lock purge flag is equal to one, program control is transferred to step 352 shown in FIG. 7d. If the lock purge flag is not equal to one, program control continues with step 340 where the program 26 updates the originating CPU and current lock count fields in the lock table 28 at the location corresponding to the lock sequence number currently being processed. Program control continues with step 342 where the program 26 determines whether an error has occurred on the communications network 16. If an error has occurred, program control continues with step 344 where an unlock request failure message is returned to the application program 22 or 24. If an error has not occurred, program control is transferred to step 346 shown in FIG. 7c.

Figure 7C:
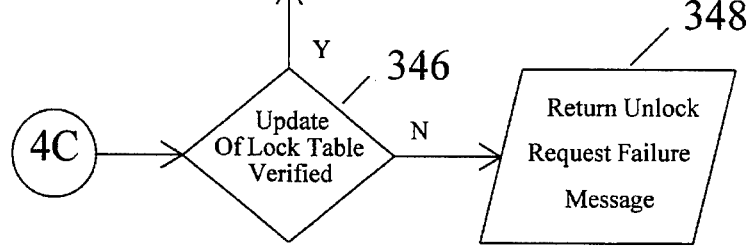

The program 26, in step 346 shown in FIG. 7c, verifies that the originating CPU and current lock count fields were updated in the lock table 28. If the updates are verified, program control continues with step 350 where an unlock request complete message is returned to the application program 22 or 24. If the updates are not verified, program control continues with step 348 where an unlock request failure message is returned to the application program 22 or 24.

Figure 7D:
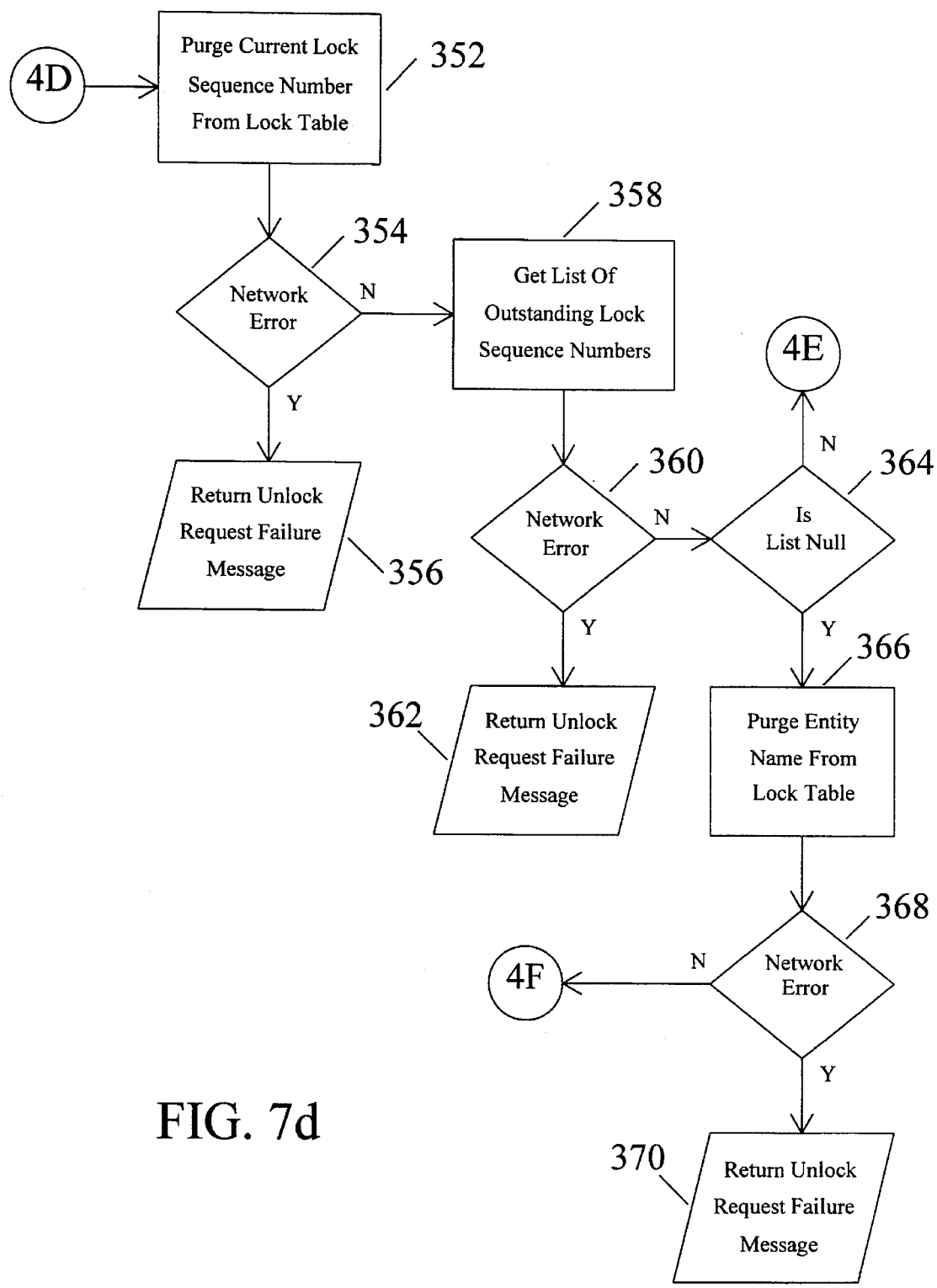

In step 352 shown in FIG. 7d, the program 26 removes the entry in the lock table 28 at the location corresponding to the current lock sequence number. Program control continues with step 354 where the program 26 determines whether an error has occurred on the communications network 16. If an error has occurred, program control continues with step 356 where an unlock request failure message is returned to the application program 22 or 24. If an error has not occurred, program control continues with step 358 where the program 26 obtains a list, from the lock sequence number cross-reference table 29, of all lock sequence numbers associated with the entity name for which an unlock request is currently being processed. Program control continues with step 360 where the program 26 determines whether an error has occurred on the communications network 16. If an error has occurred, program control continues with step 362 where an unlock request failure message is returned to the application program 22 or 24. If an error has not occurred, program control continues with step 364 where the program 26 determines whether there are any lock sequence numbers in the list generated in step 358. If there are lock sequence numbers in this list, program control continues with step 372 shown in FIG. 7e. If there are no lock sequence numbers in the list, program control continues with step 366 where the entity name on which an unlock request is currently being processed is removed from the lock sequence number cross-reference table 29. Program control continues with step 368 where the program 26 determines whether an error has occurred on the communications network 16. If an error has occurred, program control continues with step 370 where an unlock request failure message is returned to the application program 22 or 24. If an error has not occurred, program control continues with step 386 shown in FIG. 7f.

In step 372 shown in FIG. 7e, the program 26 obtains the next lock sequence number from the list generated in step 358 shown in FIG. 7d. Program control continues with step 374 where the program 26 determines whether the lock sequence number obtained in step 372 is equal to the lock sequence number currently being processed. If these lock sequence numbers are equal, program control continues with step 376 where the lock sequence number obtained in step 372 is removed from the list of lock sequence numbers generated in step 358. If the lock sequence numbers are not equal, or following step 376, program control continues with step 378 where the program 26 determines whether any lock sequence number remain in the list generated in step 358. If any lock sequence numbers remain, program control returns to step 372. If no lock sequence numbers remain in the list, program control continues with step 380 where the lock sequence number cross-reference table 29 is updated with the newly obtained list of lock sequence numbers associated with the entity name on which an unlock request is currently being processed. Program control continues with step 382 where the program 26 determines whether an error has occurred on the communications network 16. If an error has occurred, program control continues with step 384 where an unlock request failure message is returned to the application program 22 or 24. If an error has not occurred, program control continues with step 386 shown in FIG. 7f.

The program 26, in step 386 shown in FIG. 7f, determines whether the CPU 12 or 14 on which the current lock request originated is the same as the CPU 12 or 14 on which the lock table 28 is stored. If the CPUs are the same, program control continues with step 388 where an unlock request complete message is returned to the application program 22 or 24. If the CPUs are not the same, program control continues with step 390 where the program 26 verifies that the entry in the lock table 28 corresponding to the lock sequence number currently being processed was purged from the lock table 28. If the purge is not verified, program control continues with step 392 where an unlock request failure message is returned to the application program 22 or 24. If the purge is verified, program control continues with step 394 where the program 26 verifies that the entry in the lock sequence number cross-reference table 29 corresponding to the entity name with which no lock sequence numbers were associated was purged from the lock sequence number cross-reference table 29. If the purge is not verified, program control continues with step 396 where an unlock request failure message is returned to the application program 22 or 24. If the purge is verified, program control continues with step 398 where an unlock request complete message is returned to the application program 22 or 24.

C. Process Refresh Lock Request

Figure 8:
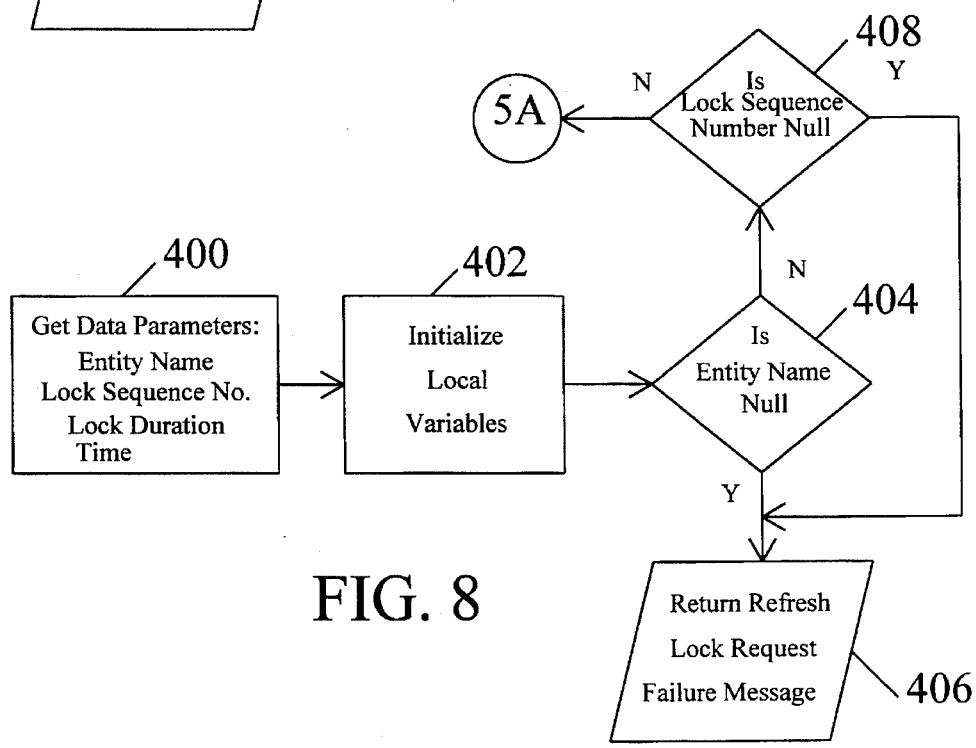
FIGS. 8 and 9a through 9c depict flow charts illustrating the steps performed by the system and method of the present invention in processing a refresh lock request.

The process refresh lock request routine begins at step 400 illustrated in FIG. 8 where the program 26 obtains certain data parameters which are passed from the calling application program 22 or 24. These parameters include the entity name ("entity name" in the lock table 28), the lock sequence number ("lock sequence number" in the lock sequence number cross-reference table 29) and the lock duration time. Program control then continues with step 402 where local variables are initialized (1) to indicate whether primary CPU 12 or secondary CPU 14 contains the lock table 28 and the lock sequence number cross-reference table 29 and (2) to identify the file directory on the indicated CPU 12 or 14 where the lock table 28 and lock sequence number cross-reference table 29 are stored. Program control continues with step 404 where the program 26 determines whether the entity name has been passed from the application program 22 or 24. If the entity name has not been passed, program control continues with step 406 where a refresh lock request failure message is returned to the application program 22 or 24. If the entity name has been passed, program control continues with step 408 where the program 26 determines whether the lock sequence number has been passed form the application program 22 or 24. If the lock sequence number has been passed, program control continues with step 410 shown in FIG. 9a. If the lock sequence number has not been passed, program control continues with step 406 where a refresh lock request failure message is returned to the application program 22 or 24.

Figure 9A:
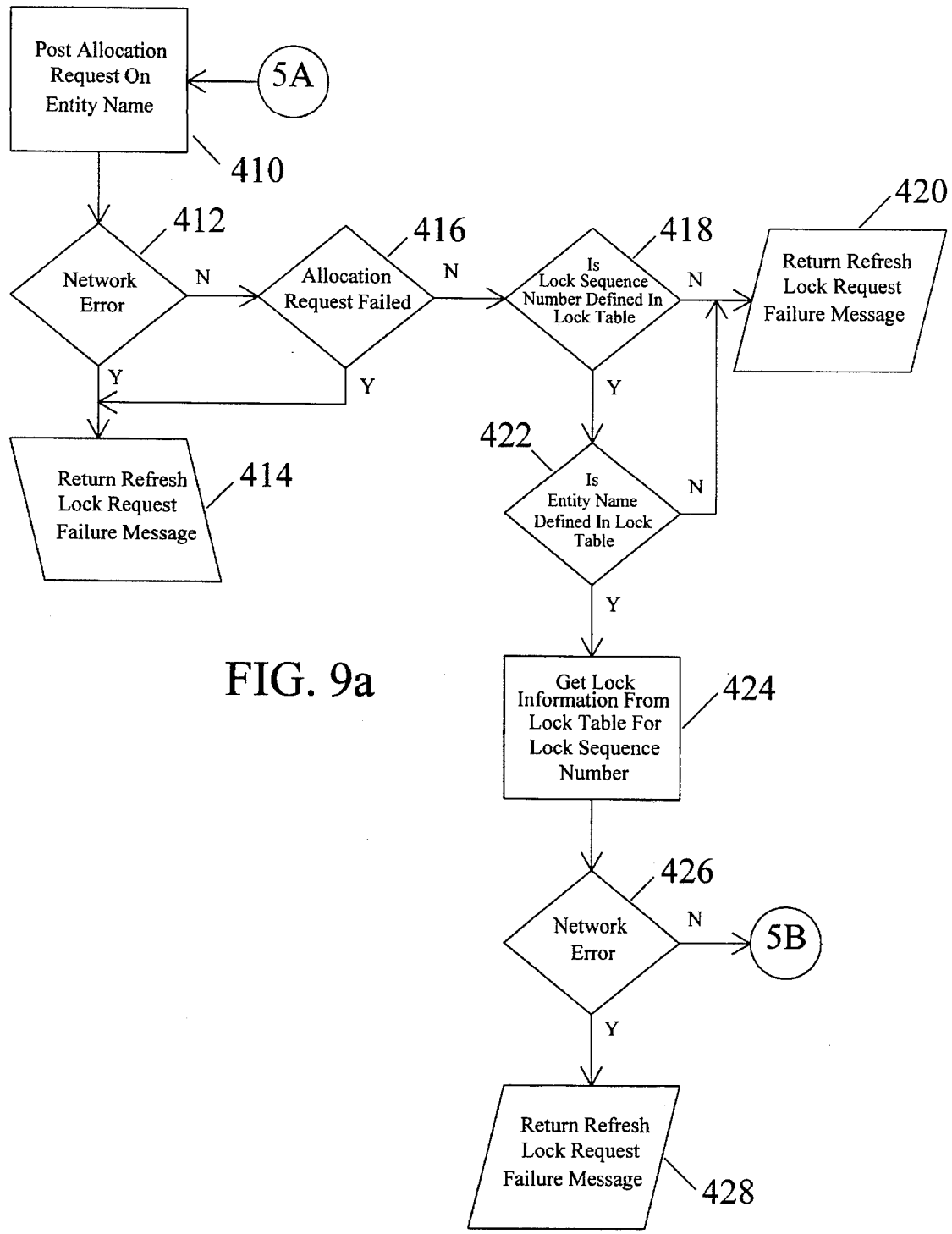

In step 410 shown in FIG. 9a, the program 26 generates an allocation request on the entity name on which a lock is to be refreshed. Program control continues with step 412 where the program 26 determines whether an error has occurred on the communications network 16. If an error has occurred, program control continues with step 414 where a refresh lock request failure message is returned to the application program 22 or 24. If an error did not occur, program control continues with step 416 where the program 26 determines whether the allocation request on the entity name has been granted. The program 26 will wait up to ten seconds for the request to be granted. If the allocation request has not been granted within this time period because the entity is currently in use by another process, program control continues with step 414 where a refresh lock request failure message is returned to the application program 22 or 24. If the allocation request is granted, program control continues with step 418 where the program 26 determines whether an entry exists at a location in the lock table 28 corresponding to the lock sequence number currently being processed. If such an entry does not exist, program control continues with step 420 where a refresh lock request failure message is returned to the application program 22 or 24. If such an entry does exist, program control continues with step 422 where the program 26 determines whether the entity name currently being processed appears in the lock sequence number cross-reference table 29. If the entry name does not appear, program control continues with step 420 where a refresh lock request failure message is returned to the application program 22 or 24. If the entry name does appear, program control continues with step 424 where the lock data at the location in the lock table 28 corresponding to the lock sequence number currently being processed is obtained. Program control continues with step 426 where the program 26 determines whether an error has occurred on the communications network 16. If an error has occurred, program control continues with step 428 where a refresh lock request failure message is returned to the application program 22 or 24. If an error has not occurred, program control continues with step 430 shown in FIG. 9b.

Figure 9B:
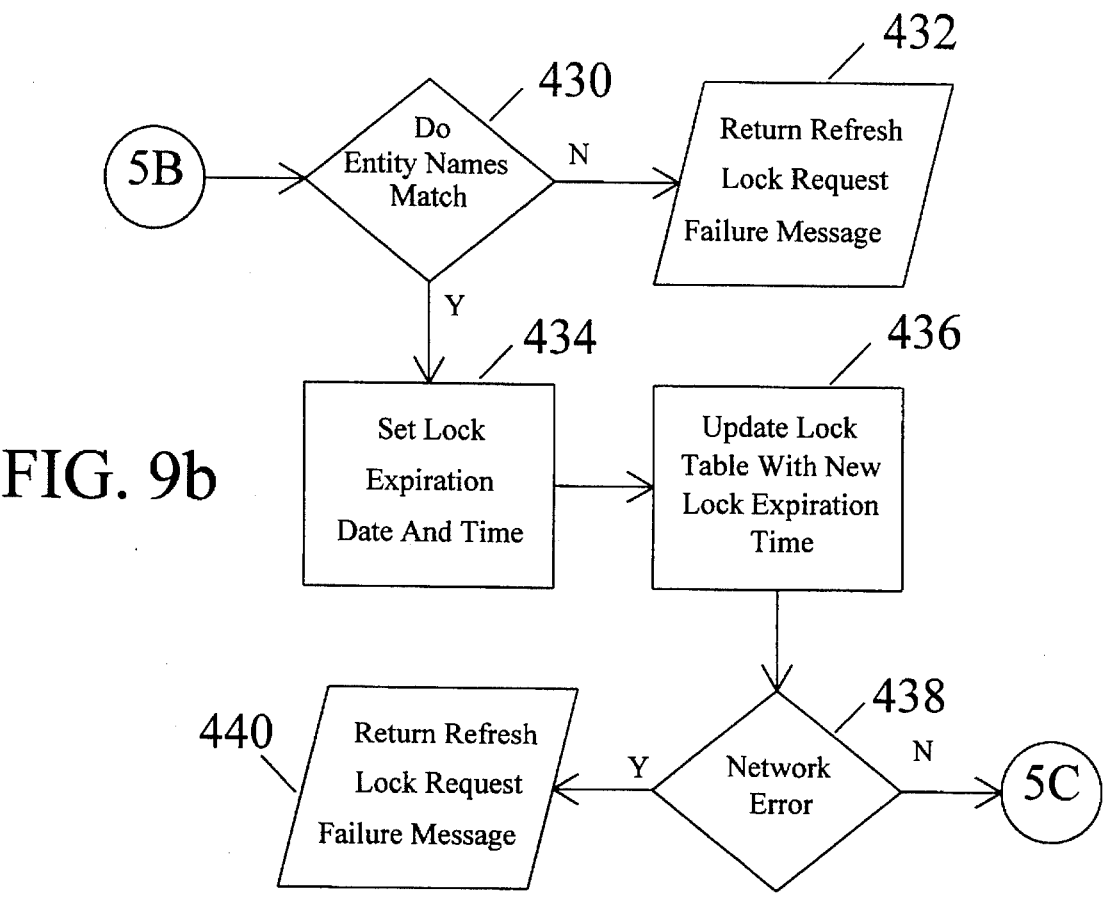
Figure 9C:
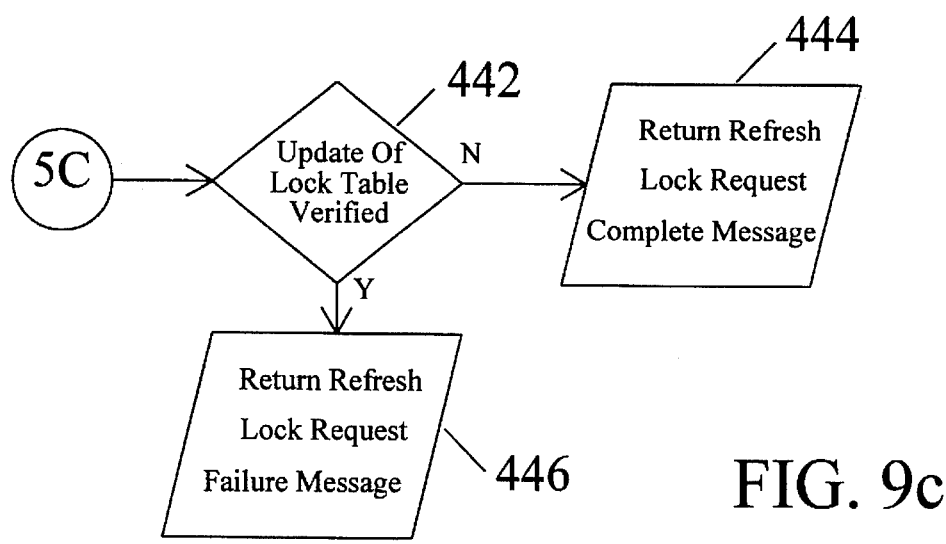

The program 26, in step 430 shown in FIG. 9b, determines whether the entity name stored at the location in the lock table 28 corresponding to the lock sequence number passed from the application program 22 or 24 matches the entity name passed from the application program 22 or 24. If the entity names do not match, program control continues with step 432 where a refresh lock request failure message is returned to the application program 22 or 24. If the entity names match, program control continues with step 434 where the new lock expiration date and time are set. Program control then continues with step 436 where the lock expiration time in the lock table entry for the lock sequence number currently being processed is updated. Program control then continues with step 438 where the program 26 determines whether an error has occurred on the communications network 16. If an error has occurred, program control continues with step 440 where a refresh lock request failure message is returned to the application program 22 or 24. If an error has not occurred, program control continues with step 442 shown in FIG. 9c.

The program 26, in step 442, verifies that the lock table 28 has been updated with the new lock expiration time. If the update is not verified, program control continues with step 444 where a refresh lock request failure message is returned to the application program 22 or 24. If the update is verified, program control continues with step 446 where a refresh lock request complete message is returned to the application program 22 or 24.

Application Program

Figure 10:
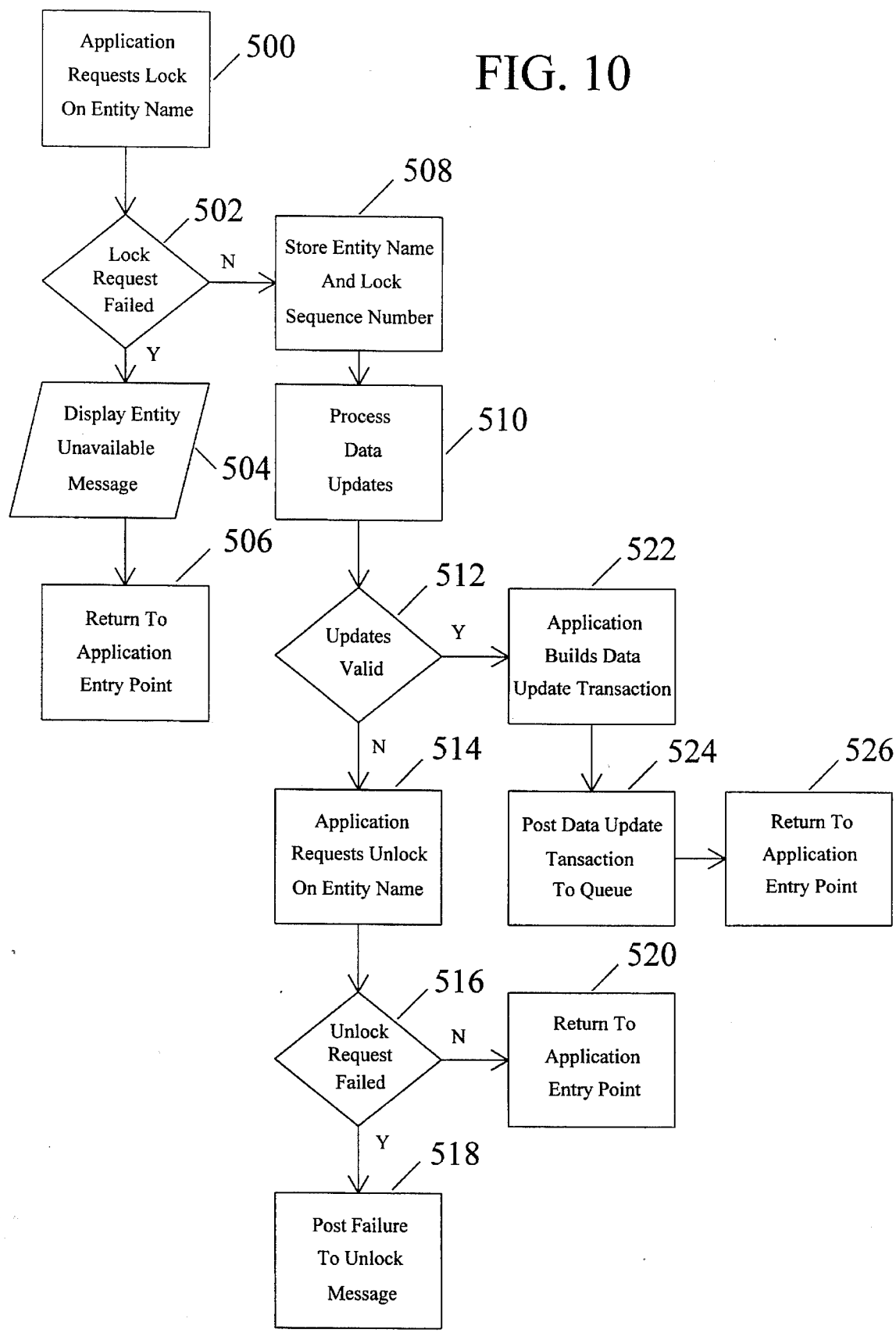
FIG. 10 depicts a flow chart illustrating the steps performed by an application program when used in conjunction with the system and method of the present invention.

The operation of the application programs 22 or 24 as it relates to the system and method of the present invention is depicted in the flow chart of FIG. 10. Program control begins with step 500 where the application program 22 or 24 initiates a lock request on an entity name by calling the lock manager program 26 and passing the appropriate data parameters. Program control then continues with step 502 where the program 22 or 24 determines whether the lock request has failed. The program 22 or 24 makes this determination by examining a message which is returned from the lock manager program 26 to the program 22 or 24 indicating whether the lock request has failed or whether the lock request is complete. If the lock request has failed, program control continues with step 504 where a message is displayed to the user of the program 22 or 24 indicating that the entity name on which a lock request has been generated is currently not available for processing activity. Program control then continues with step 506 where program control is transferred back to the point in the program 22 or 24 where the lock request was initiated.

If the determination is made in step 502 that the lock request has not failed, program control continues with step 508 where the program 22 or 24 stores internally the entity name, on which a lock request has been initiated and the lock sequence number which is assigned by the lock manager program 26. Program control then continues with step 510 where the program 22 or 24 completes processing of data updates to be made to the databases 18 and 20. The program 22 or 24 then determines, in step 512, whether the data updates are valid. If the data updates are not valid, program control continues with step 514 where the program 22 or 24 initiates an unlock request on the entity name for which a lock request was generated in step 500. The program 22 or 24 then determines, in step 516, whether the unlock request has failed. The program 22 or 24 makes this determination by examining a message which is returned from the lock manager program 26 to the program 22 or 24 indicating whether the unlock request has failed or whether the unlock request is complete. If the unlock request has failed, program control continues with step 518 where an unlock failure message is posted internally to the program 22 or 24 so that another unlock request may be initiated at a later time. If the unlock request has not failed, program control continues with step 520 where program control is returned to the point in the program 22 or 24 where the lock request was initiated.

If the program 22 or 24 determines, in step 512, that the data updates are valid, program control is transferred to step 522 where the program 22 or 24 builds a data update transaction. In addition to the data updates to be made to the database 18 or the database 20, the data update transaction also includes the entity name and lock sequence number previously stored in step 508. Program control continues with step 524 where the data update transaction is posted to a transaction processor queue on the primary CPU 12 or the secondary CPU 14 where the program 22 or 24 resides. The program 22 or 24, in step 526, then transfers program control back to the point in the program 22 or 24 where the lock request was initiated.

Transaction Processor

Figure 11:
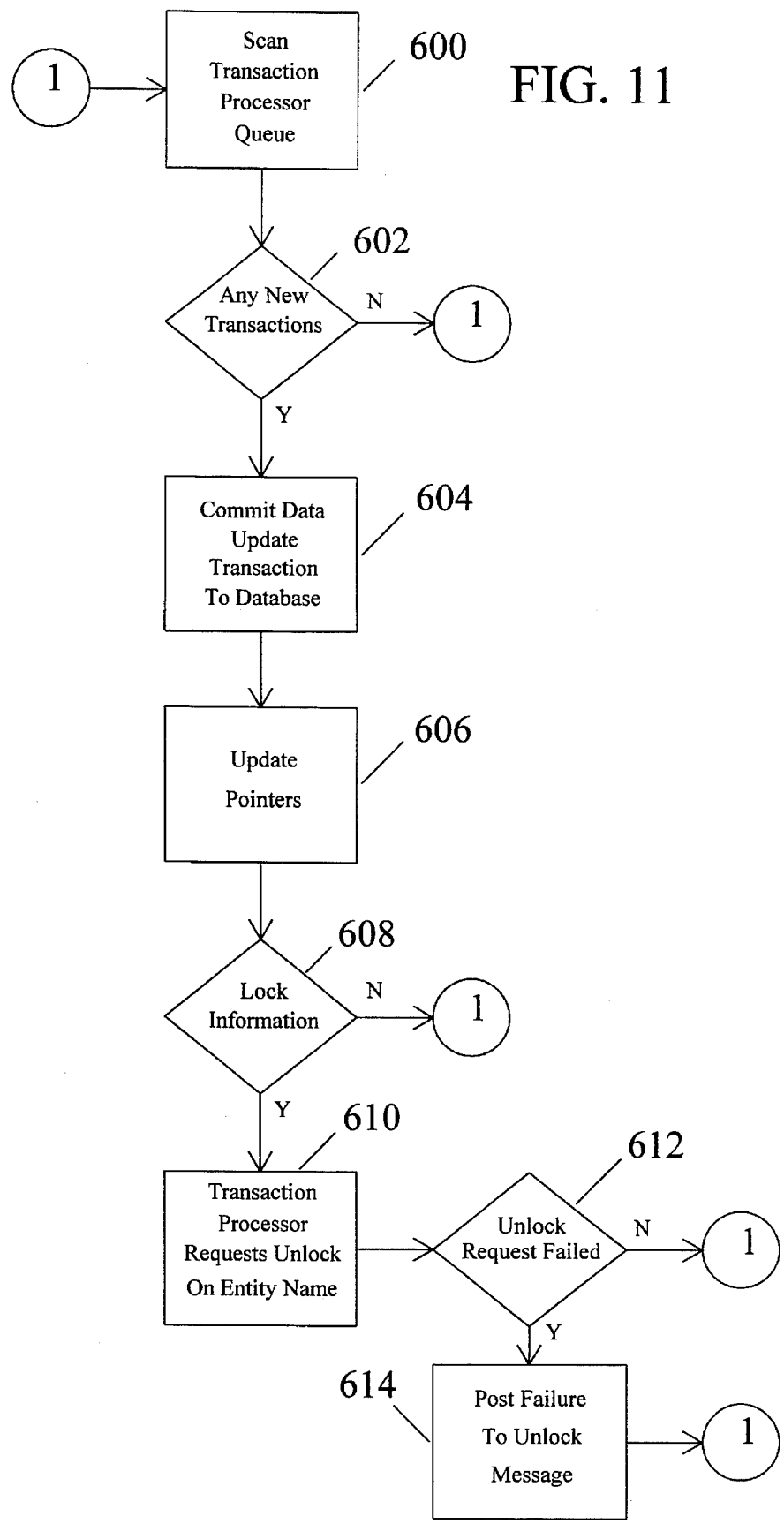
FIG. 11 depicts a flow chart illustrating the steps performed by the transaction processor of the present invention.

The operation of the transaction processor program 30 as it relates to the system and method of the present invention is depicted in the flow chart of FIG. 11. Program control begins at step 600 where the program 30 scans the transaction processor queue on the primary CPU 12 or the secondary CPU 14 where the transaction processor program 30 resides to determine whether any data update transactions have been posted to the transaction processor queue since the last time that the queue was scanned. The program 30 then determines, in step 602, whether any new transactions have been posted to the transaction processor queue. If no new transactions have been posted to the queue, program control is returned to step 600. If new transactions have been posted to the queue, program control continues with step 604 where the first new data update transaction in the transaction processor queue is committed to the database 18 or 20 on either the primary CPU 12 or the secondary CPU 14 on which the transaction processor program 30 resides. Program control continues with step 606 where pointers which indicate the last data update transaction in the transaction processor queue which has been processed are updated. Program control continues with step 608 where the program 30 determines whether the data update transaction which has been committed to the database contains any lock information. If the data update transaction does not contain lock information, program control is returned to step 600; if the data update transaction does contain lock information, program control continues with step 610 where the program 30 initiates an unlock request on the entity name contained in the data update transaction by calling the lock manager program 26 and passing the appropriate data parameters. In step 612, the program 30 determines whether the unlock request has failed. This determination is made by examining a message returned from the lock manager program 26 to the program 30 indicating whether the unlock request has failed or whether it is complete. If the unlock request has not failed, program control is returned to step 600. If the unlock request has failed, program control continues with step 614 where an unlock failure message is posted internally to the program 30 so that the unlock request can be reinitiated at a later time. Program control is then returned to step 600.

Network Processor

Figure 12:
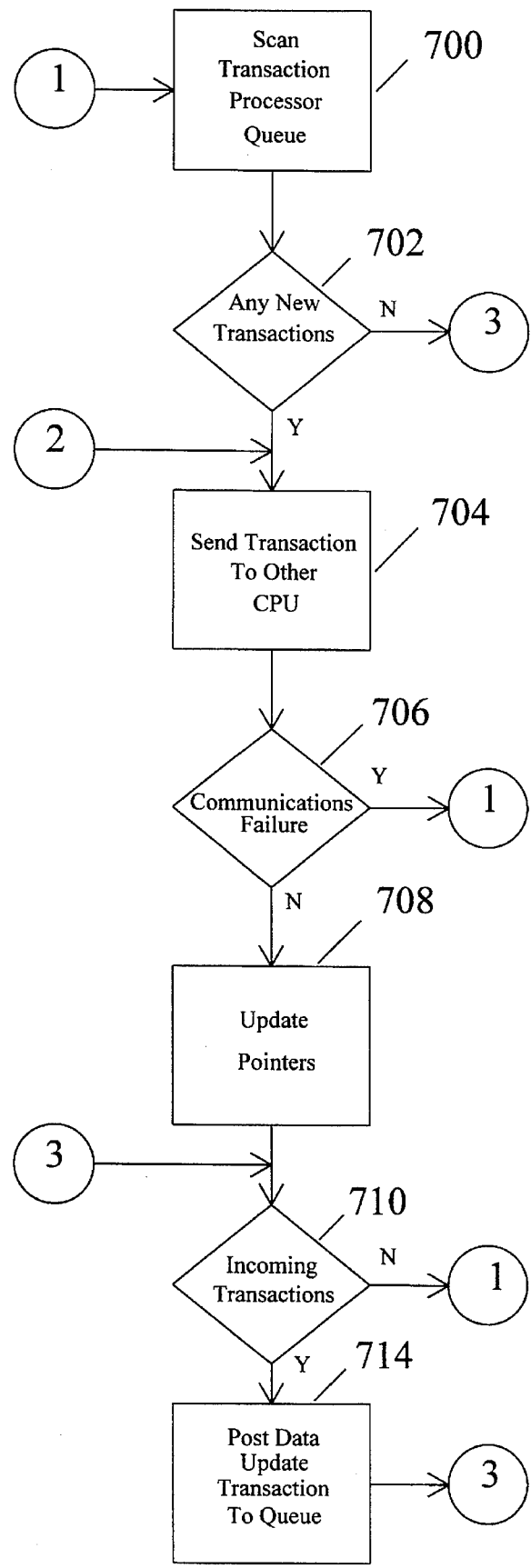
FIG. 12 depicts a flow chart illustrating the steps performed by the network processor of the present invention.

The operation of the network processor program 32 as it relates to the system and method of the present invention is depicted in the flow chart of FIG. 12. Program control begins with step 700 where the network processor program 32 scans the transaction processor queue on the primary CPU 12 or the secondary CPU 14 where the network processor program 32 resides to determine whether any data update transactions have been posted to the transaction processor queue by the application programs 22 or 24. The program 32 then determines, in step 702, whether any new data update transactions have been posted to the transaction processor queue since the last time it was scanned by the program 32. If no new transactions have been posted to the queue, program control is transferred to step 710. If new transactions have been posted to the queue, program control continues with step 704 where the first new data update transaction in the transaction processor queue is transmitted via the communications link 16 to the network processor program 32 on either the primary CPU 12 or the secondary CPU 14 which is not the CPU 12 or 14 on which the program 32 currently processing the transaction resides ("the other CPU"). Program control continues with step 706 where the program 32 determines whether a communications failure with the other CPU 12 or 14 has occurred. If a communications failure has occurred, program control is returned to step 700. If a communications failure has not occurred, program control continues with step 708 where pointers which indicate the last data update transaction in the transaction processor queue which has been processed by the program 32 are updated.

Program control then continues with step 710 where the program 32 determines whether any data update transactions have been transmitted from the network processor program 32 on the other CPU 12 or 14. If no data update transactions have been transmitted, program control is returned to step 700. If any data update transactions have been transmitted, program control continues with step 714 where the program 32 then posts the received data update transaction to the transaction processor queue on the CPU 12 or 14 on which the program 32 resides. Program control is returned to step 710.

While the present invention has been described in connection with an exemplary embodiment thereof, it will be understood that many modifications and variations will be readily apparent to those of ordinary skill in the art. This disclosure and the following claims are intended to cover all such modifications and variations.

What we claim is:

1. A system for maintaining the integrity of two autonomous databases across a computer network, the computer network consisting of two central processing units interconnected by a communications network, two autonomous databases each consisting of the same plurality of entities and wherein one of the databases resides on each of the central processing units, a transaction processor residing on each of the central processing units, application programs residing on each of the central processing units, a network processor residing on each of the central processing units, and a lock manager residing on each of the central processing units, said system for maintaining the value assigned to each entity the same between the two databases, said system comprising:

means, within each lock manager, for maintaining a lock database on one of the central processing units;

means, within each application program, for initiating a request for a lock to be placed on an identified entity in both of the databases to enable a data update transaction to be performed on said identified entity in both of the databases;

means, within each lock manager, for enabling one of the lock managers to lock said identified entity in both of the databases, in response to said means for initiating said lock request, by establishing an entry for said identified entity in said lock database;

means, within each application program, for entering said data update transaction in a transaction processor queue;

means, within each network processor, for transmitting said data update transaction to the other network processor;

means, within each transaction processor for performing said data update transaction on said identified entity in the database on the central processing unit on which that transaction processor resides and for initiating an unlock request on said identified entity after said data update transaction has been performed; and means, within each lock manager, for unlocking said identified entity only in the database on the central processing unit on which that lock manager resides, in response to said means for initiating said unlock request, by modifying said entry for said identified entity in said lock database and transferring ownership of the lock, when necessary, to the CPU where the update transaction was performed.

2. A system for maintaining the integrity of two autonomous databases across a computer network, the computer network consisting of two central processing units interconnected by a communications network, two databases each consisting of the same plurality of entities and wherein one of the databases resides on each of the central processing units, a transaction processor residing on each of the central processing units, application programs residing on each of the central processing units, a network processor residing on each of the central processing units, and a lock manager residing on each of the central processing units, said system for maintaining the value assigned to each entity the same between the two databases, said system comprising:

means, within the lock manager on each central processing unit, for maintaining a lock database on one of the central processing units;

means, within the application program on one of the central processing units, for initiating a request for a lock to be placed on an identified entity in both of the databases to enable a data update transaction to be performed on said identified entity in both of the databases;

means, within the lock manager residing on the same central processing unit as said means for initiating said lock request, for locking said identified entity in both of the databases, in response to said means for initiating said lock request, by establishing an entry for said identified entity in said lock database;

means, within the application program containing said means for initiating said lock request, for entering said data update transaction in a transaction processor queue residing on the same central processing unit as said means for initiating said lock request;

means, within the network processor residing on the same central processing unit as said means for initiating said lock request, for transmitting said data update transaction to the network processor residing on the other central processing unit;

means, within the transaction processor on each central processing unit, for performing said data update transaction on said identified entity in the database on the central processing unit on which that transaction processor resides;

means, within the transaction processor on each central processing unit, for initiating an unlock request on said identified entity after said data update transaction has been performed on said identified entity in the database on the central processing unit on which that transaction processor resides; and means, within the lock manager on each central processing unit, for unlocking said identified entity only in the database on the central processing unit on which that lock manager resides, in response to said means for initiating said unlock request, by modifying said entry for said identified entity in said lock database and transferring ownership of the lock, when necessary, to the CPU where the update transaction was performed.

3. The system of claim 2 wherein said means for locking said identified entity includes means for establishing said entry for said identified entity in said lock database by storing in said lock database an entity name, a lock expiration time, an originating central processing unit, a current lock count, and an original lock count.

4. The system of claim 3 wherein said means for locking said identified entity includes means for assigning a lock sequence number to said lock request thereby forming a unique entity name-lock sequence number pair to identify said lock request.

5. The system of claim 4 wherein a location of said established entry in said lock database corresponds to said assigned lock sequence number and wherein said lock sequence number is stored with said entity name in a cross-reference table.

6. The system of claim 5 wherein said means for locking said identified entity includes means for initializing both said current lock count in said established entry and said original lock count in said established entry to a value of two.

7. The system of claim 6 wherein said means for locking said identified entity includes means for determining whether said entity name of said identified entity is stored in said lock database.

8. The system of claim 7 wherein said means for determining whether said entity name of said identified entity is stored in said lock database includes means for determining whether said entity name is stored in said cross-reference table.

9. The system of claim 8 wherein said means for locking said identified entity includes means for granting said lock request if said entity name does not appear in said lock database.

10. The system of claim 9 wherein said means for locking said identified entity includes means for granting said lock request if said entity name appears in said lock database, said current lock count in said established entry is equal to one, and said originating central processing unit in said established entry is the same as the central processing unit from which said lock request originated.

11. The system of claim 3 wherein said means for unlocking said identified entity includes means for decrementing said current lock count in said established entry by one.

12. The system of claim 11 wherein said means for unlocking said identified entity includes means for removing said established entry from said lock database if said current lock count in said established entry equals zero.

13. The system of claim 12 wherein said means for unlocking said identified entity includes means for modifying said originating central processing unit in said established entry if said originating central processing unit in said established entry is not the same as the central processing unit from which said unlock request originated.

14. The system of claim 3 wherein said means for locking said identified entity initializes said lock expiration time to zero to create an infinite lock and wherein said means for locking said identified entity initializes said lock expiration time to a non-zero integer to create a finite lock.

15. The system of claim 14 wherein said means for locking said identified entity includes means for granting said lock request if said lock expiration time in said established entry is a non-zero integer which corresponds to a time of day earlier than a time of day at which said lock request was initiated.

16. A method for maintaining the integrity of two autonomous databases across a computer network, the computer network consisting of two central processing units interconnected by a communications network and two autonomous databases each consisting of the same plurality of entities and wherein one of the databases resides on each of the central processing units, said method for maintaining the value assigned to each entity the same between the two databases, said method comprising the steps of:

maintaining a lock database on one of the central processing units;

initiating a request for a lock to be placed on an identified entity in both of the databases to enable a data update transaction to be performed on said identified entity in both of the databases;

establishing an entry for said identified entity in said lock database, in response to said step of initiating said lock request, thereby locking said identified entity in both of the databases;

entering said data update transaction in a transaction processor queue;

transmitting said data update transaction to a transaction processor queue on the other central processing unit in the computer network;

performing said data update transaction on said identified entity in one of the databases;

initiating an unlock request on said identified entity in only said one of the databases after performing said data update transaction on said identified entity in said one of the databases; and unlocking said identified entity in only said one of the databases, in response to said step of initiating said unlock request, by modifying said entry for said identified entity in said lock database and transferring ownership of the lock, when necessary, to the CPU where the update transaction was performed.

* * * * *

UNITED STATES PATENT AND TRADEMARK OFFICE
CERTIFICATE OF CORRECTION

PATENT NO. : 5,459,862
DATED : October 17, 1995
INVENTOR(S) : James F. Garliepp, Paul E. Siml, Jane D. Hiscox, Terry R. Friedrichsen It is certified that error appears in the above-indentified patent and that said Letters Patent is hereby corrected as shown below:

Col. 4, line 3, delete "25".

Signed and Sealed this

Eighteenth Day of June, 1996

Attest:

BRUCE LEHMAN

*Attesting Officer*      *Commissioner of Patents and Trademarks*